United States Patent
Zhu et al.

(10) Patent No.: US 9,439,142 B2
(45) Date of Patent: Sep. 6, 2016

(54) POWER SAVING FOR LOW LATENCY DETERMINISTIC NETWORKS IN WIRELESS PERSONAL AREA NETWORKS

(71) Applicant: Samsung Electronics Company, Ltd., Suwon, Gyeonggi-Do (KR)

(72) Inventors: Chunhui Zhu, San Jose, CA (US); Youngsoo Kim, Seoul (KR); Chiu Ngo, Millbrae, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 14/078,323

(22) Filed: Nov. 12, 2013

(65) Prior Publication Data

US 2014/0269474 A1 Sep. 18, 2014

Related U.S. Application Data

(60) Provisional application No. 61/788,517, filed on Mar. 15, 2013.

(51) Int. Cl.
 *H04W 52/02* (2009.01)

(52) U.S. Cl.
 CPC ..... *H04W 52/0216* (2013.01); *H04W 52/0229* (2013.01); *H04W 52/0209* (2013.01); *H04W 52/0212* (2013.01); *Y02B 60/50* (2013.01)

(58) Field of Classification Search
 CPC ................................................ H04W 52/0216
 USPC ................. 370/236, 311, 326, 328, 329, 331
 See application file for complete search history.

(56) References Cited

U.S. PATENT DOCUMENTS

| | | | | |
|---|---|---|---|---|
| 6,192,230 B1* | 2/2001 | van Bokhorst | ... | H04W 52/0216 370/311 |
| 7,593,745 B2* | 9/2009 | Shih | ... | H04W 52/0251 455/432.1 |
| 7,660,578 B2* | 2/2010 | Viitamaki | ... | H04L 12/12 455/41.2 |
| 8,184,566 B2* | 5/2012 | Yeh | ... | H04W 52/0216 370/311 |
| 8,274,894 B2* | 9/2012 | Kneckt | ... | H04W 52/0251 370/230 |
| 8,325,610 B2* | 12/2012 | Fischer | ... | H04L 12/12 370/236 |
| 8,416,803 B1* | 4/2013 | Basson | ... | H04L 69/06 370/465 |
| 8,542,620 B2* | 9/2013 | Sampathkumar | . | H04W 52/0216 370/311 |
| 8,576,761 B1* | 11/2013 | Pitchaiah | ... | H04W 52/0206 370/311 |
| 8,611,268 B1* | 12/2013 | Thandaveswaran | ... | H04W 52/0206 370/311 |

(Continued)

*Primary Examiner* — Andrew Lai
*Assistant Examiner* — Andrew C Lee
(74) *Attorney, Agent, or Firm* — Sherman IP LLP; Kenneth L. Sherman; Steven Laut

(57) ABSTRACT

Wireless communication in a wireless network comprises a wireless device communicating power save capability information with a coordinator during a discovery state. A beacon that indicates a configuration state is received by the wireless device. Configuration status information is sent to the coordinator. A configuration request is received by the wireless device from the coordinator for entering or exiting the power save mode.

28 Claims, 18 Drawing Sheets

(56) References Cited

U.S. PATENT DOCUMENTS

| | | | | |
|---|---|---|---|---|
| 8,755,848 B2* | 6/2014 | Jain | | H04W 88/06 340/539.3 |
| 2003/0152059 A1* | 8/2003 | Odman | | H04B 1/69 370/338 |
| 2005/0135284 A1* | 6/2005 | Nanda | | H04L 29/06068 370/294 |
| 2005/0141470 A1* | 6/2005 | Jung | | H04W 52/0225 370/338 |
| 2005/0227615 A1* | 10/2005 | Sakoda | | H04W 48/08 455/7 |
| 2007/0053315 A1* | 3/2007 | Sugaya | | H04W 84/18 370/318 |
| 2007/0147317 A1* | 6/2007 | Smith | | H04W 48/18 370/338 |
| 2007/0287456 A1* | 12/2007 | Shimizu | | H04W 52/0251 455/435.1 |
| 2008/0075029 A1* | 3/2008 | Song | | H04L 45/123 370/311 |
| 2008/0247377 A1* | 10/2008 | Van Horn | | H04W 52/0225 370/348 |
| 2009/0149127 A1* | 6/2009 | Viitamaki | | H04M 1/0245 455/41.2 |
| 2009/0268652 A1* | 10/2009 | Kneckt | | H04W 52/0235 370/311 |
| 2010/0039973 A1* | 2/2010 | Cavalcanti | | H04W 74/04 370/311 |
| 2010/0067421 A1* | 3/2010 | Gorokhov | | H04W 52/0206 370/311 |
| 2010/0112960 A1* | 5/2010 | Shao | | H04W 52/0225 455/73 |
| 2011/0038290 A1* | 2/2011 | Gong | | H04W 52/0235 370/311 |
| 2011/0069649 A1* | 3/2011 | Gobriel | | H04W 52/0232 370/311 |
| 2011/0093710 A1* | 4/2011 | Galvin | | H04L 63/061 713/169 |
| 2011/0161697 A1* | 6/2011 | Qi | | G06F 1/3209 713/320 |
| 2011/0176463 A1* | 7/2011 | Cowan | | H04W 52/0216 370/311 |
| 2012/0082078 A1* | 4/2012 | Goto | | H04W 52/02026 370/311 |
| 2012/0155349 A1* | 6/2012 | Bajic | | H04W 4/008 370/311 |
| 2012/0315960 A1* | 12/2012 | Kim | | H04W 52/0254 455/574 |
| 2013/0107727 A1* | 5/2013 | Lunden | | H04W 52/0251 370/252 |
| 2013/0182795 A1* | 7/2013 | Cherian | | H04L 25/02 375/316 |
| 2013/0215788 A1* | 8/2013 | He | | H04W 52/0232 370/253 |
| 2013/0258919 A1* | 10/2013 | Damnjanovic | | H04W 52/0209 370/311 |
| 2014/0064487 A1* | 3/2014 | Abraham | | H04L 63/045 380/270 |
| 2014/0112189 A1* | 4/2014 | Abraham | | H04W 4/206 370/254 |
| 2014/0112224 A1* | 4/2014 | Jafarian | | H04W 52/0209 370/311 |
| 2014/0126391 A1* | 5/2014 | Liu | | H04W 52/0206 370/252 |
| 2014/0143568 A1* | 5/2014 | Kim | | G06F 1/3206 713/323 |
| 2014/0206346 A1* | 7/2014 | Kiukkonen | | H04W 52/0229 455/426.1 |
| 2014/0281623 A1* | 9/2014 | Zhang | | G06F 1/3209 713/323 |

* cited by examiner

POWER SAVING FOR LOW LATENCY DETERMINISTIC NETWORKS IN WIRELESS PERSONAL AREA NETWORKS

CROSS-REFERENCE TO RELATED APPLICATIONS

This application claims the priority benefit of U.S. Provisional Patent Application Ser. No. 61/788,517, filed Mar. 15, 2013, incorporated herein by reference in its entirety.

TECHNICAL FIELD

One or more embodiments relate generally to low latency deterministic network (LLDN) devices in a wireless personal area network (WPAN), and in particular, to power saving for LLDN devices in WPANs.

BACKGROUND

The IEEE 802.15.4e standard, published in 2012, includes support for Low Latency Deterministic Networks (LLDNs). An LLDN is defined as a personal area network (PAN) organized as a star network with a superframe structure and using LLDN frames. The LLDN mechanism of the IEEE 802.15.4 brings many benefits for certain applications. These applications require low-latency and reliable periodic transmissions from sensor devices (such as ECG sensors) to the PAN coordinator. The LLDN superframe structure allows usage of implicit addressing which greatly reduces the media access control (MAC) control overhead. It also provides guaranteed channel access at a LLDN device's pre-assigned time slot, so that critical sensor data can be reported to the coordinator in a timely manner.

An LLDN superframe contains multiple time slots for data transmissions/retransmission. According to the current standard, if a device does not need to retransmit a failed frame occurred in the previous superframe, it only needs to transmit once in its own uplink time slot (assuming it has data to send), but it has to remain powered on during other devices' uplink time slots or bidirectional time slots.

SUMMARY

One or more embodiments relate to a wireless communication in a wireless network. In one embodiment, a method comprises a wireless device communicating power save capability information with a coordinator during a discovery state. In one embodiment, a beacon that indicates a configuration state is received by the wireless device. In one embodiment, configuration status information is sent to the coordinator. In one embodiment, a configuration request is received by the wireless device from the coordinator for entering or exiting the power save mode.

In one embodiment, a wireless device comprises a wireless device including a Physical Layer (PHY) for wireless communication over a wireless communication channel, a media access control (MAC) layer and a power save module that communicates power save capability information with a coordinator during a discovery state. In one embodiment, the power save module sends configuration status information to the coordinator based on a received beacon indicating a configuration state, and receives a configuration request from the coordinator for entering or exiting the power save mode.

In one embodiment, a wireless coordinator comprises a Physical Layer (PHY) for wireless communication over a wireless communication channel, and a MAC layer that manages transmissions for multiple wireless stations over a wireless channel. In one embodiment, the coordinator receives power save capability information from a wireless device during a discovery state, sends a beacon including a request for configuration status information to the wireless device, receives a configuration status from the wireless device, and sends a configuration request to the wireless device for entering or exiting the power save mode.

These and other features, aspects and advantages of the one or more embodiments will become understood with reference to the following description, appended claims and accompanying figures.

DETAILED DESCRIPTION

One or more embodiments provide for an LLDN device to enter a sleep state (e.g., power save mode) when not transmitting/receiving frames from the coordinator (e.g., PAN coordinator). One or more embodiments, provide for the coordinator to direct some or all LLDN devices to enter a sleep state when the coordinator determines there will be a predetermined long, inactive period between current operation or measurement and the next operation or measurement. One or more embodiments provide the LLDN devices to enter a sleep state without necessitating additional command frames created.

One or more embodiments relate to a wireless communication in a wireless network (e.g., LLDN in PAN). In one embodiment, a method comprises a wireless device communicating power save capability information with a coordinator during a discovery state. In one embodiment, a beacon that indicates a configuration state is received by the wireless device. In one embodiment, configuration status information is sent to the coordinator. In one embodiment, a configuration request is received by the wireless device from the coordinator for entering or exiting the power save mode.

Figure 1:
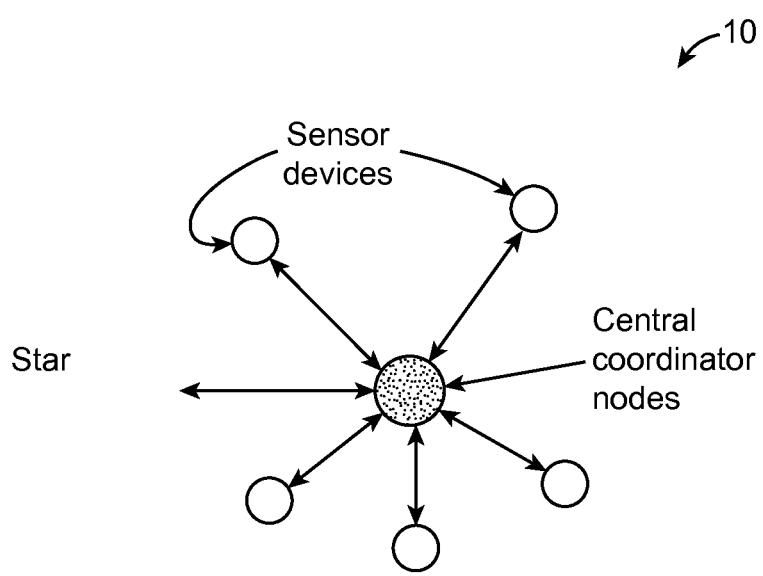
FIG. 1 shows a diagram of a wireless low latency deterministic network (LLDN) system in a star configuration for use with one or more embodiments.

FIG. 1 shows a diagram of a wireless low latency deterministic network (LLDN) system 10 in a star configuration for use with one or more embodiments. With regard to networking capability, the IEEE 802.1.5.4 standard defines two topologies. One of them is a basic star as shown as system 10. All communications between nodes must pass through the central coordinator node.

Figure 2:
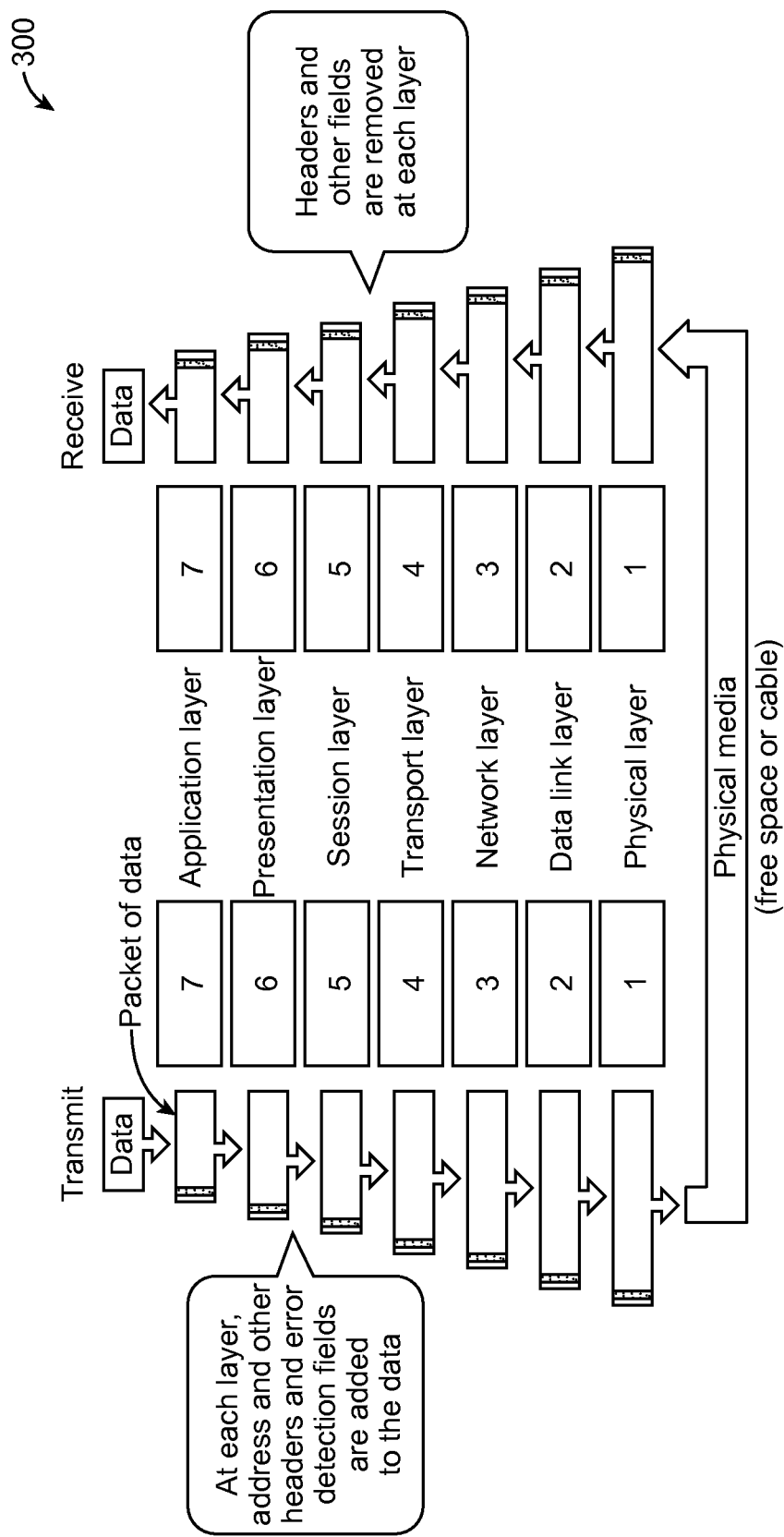
FIG. 2 shows an example open systems Interconnection (OSI) layer diagram.

FIG. 2 shows an example open systems Interconnection (OSI) layer diagram 300. The IEEE 802.15.4 standard defines the physical layer (PHY) (layer 1) and media access control (MAC) layer (sub-layer of the data link layer 2) of the Open Systems Interconnection (OSI) model of network operation. The PHY layer 1 defines frequency, power, modulation, and other wireless conditions of the link. The MAC layer (of layer 2) defines the format of the data handling and is responsible for moving data packets to/from devices (e.g., to and from a network interface card (NIC) to another across a shared channel). In one example, the MAC layer uses MAC protocols to ensure that signals sent from different wireless devices across the same channel do not collide. The remaining layers (3-7) define other measures for handling the data and related protocol enhancements including the final application.

As used in one or more embodiments, The IEEE 802.15.4 standard uses only the first two layers plus the logical link control (LLC) and service specific convergence sub-layer (SSCS) additions to communicate with all upper layers as defined by additional standards. The data link layer 2 is the protocol layer that transfers data between adjacent network nodes in a wide area network (WAN) or between nodes on the same local area network (LAN) segment or PAN. The data link layer 2 provides the functional and procedural means to transfer data between network entities and might provide the means to detect and possibly correct errors that may occur in the physical layer 1. Examples of data link protocols are Ethernet for LANs (multi-node), the Point-to-Point Protocol (PPP), HDLC and ADCCP for point-to-point (dual-node) connections, etc.

The data link layer 2 is concerned with local delivery of frames between devices on the same LAN or PAN. Data-link frames, as these protocol data units are called, do not cross the boundaries of a local network. Inter-network routing and global addressing are higher layer functions, allowing data-link protocols to focus on local delivery, addressing, and media arbitration. In this way, the data link layer 2 endeavors to arbitrate between parties contending for access to a medium, without concern for their ultimate destination.

When devices attempt to use a medium simultaneously, frame collisions occur. Data-link protocols specify how devices detect and recover from such collisions, and may provide mechanisms to reduce or prevent them. Delivery of frames by layer 2 devices is effected through the use of unambiguous hardware addresses. A frame's header contains source and destination addresses that indicate which device originated the frame and which device is expected to receive and process it. In contrast to the hierarchical and routable addresses of the network layer 3, layer 2 addresses are flat, meaning that no part of the address may be used to identify the logical or physical group to which the address belongs. The data link layer 2 provides data transfer across the physical link layer 1. That transfer may be reliable or unreliable; many data-link protocols do not have acknowledgments of successful frame reception and acceptance, and some data-link protocols might not even have any form of checksum to check for transmission errors. In those cases, higher-level protocols must provide flow control, error checking, and acknowledgments and retransmission.

Figure 3:
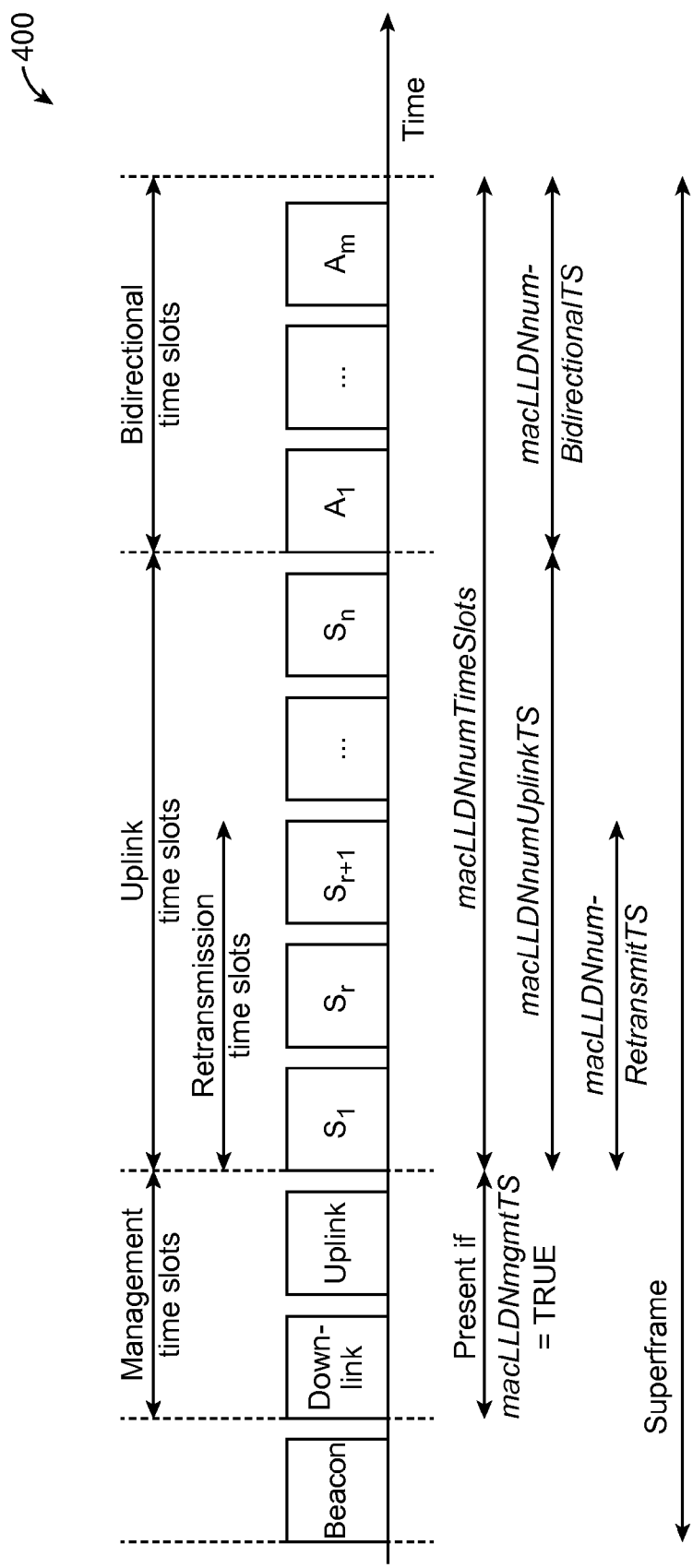
FIG. 3 shows an example LLDN superframe with dedicated time slots.

FIG. 3 shows an example LLDN superframe 400 with dedicated time slots that may be used by one or more embodiments. Superframe 400 includes macLLDNnumTimeSlots time slots for data transmissions. In typical LLDNs, if a device (e.g., a wireless LLDN device) does not need to retransmit a failed frame that occurred in the previous superframe, the device only needs to transmit once in its own uplink time slot (assuming it has data to send), but the device has to stay powered on during other devices' uplink time slots or bidirectional time slots. Remaining powered on by a device during other device's time slots is a waste of energy, especially when the number of data time slots is large.

A typical LLDN network uses a different superframe structure than the legacy superframe structure defined in or before IEEE 802.15.4-2011. A typical LLDN superframe is divided into a beacon slot, 0 or 2 management time slots, and a number of time slots of equal length for data transmission, as shown in superframe 400. The first time slot of each superframe contains a low latency (LL) beacon frame, which is always present. The LL beacon frame is used for synchronization with the superframe 400 structure. The LL beacon frame is also used for re-synchronization of devices. The LL beacon time slot may be followed by two management time slots, one for downlink and one for uplink. The management time slots are configurable during the configuration state (see FIG. 5) by the macLLDNmgmtTS PIB parameter (PAN Information Base parameter). The remaining time slots (i.e., data time slots) are assigned to the LLDN devices in the network.

Typical features of the data time slots include the following. Each time slot may have assigned a so-called slot owner. The slot owner has access privileges in the time slot (dedicated time slot). There is no explicit addressing necessary inside the frames if the slot owner transmits in its time slot. The determination of the sender is achieved through the number of the time slot. More than one device may be assigned to a time slot (shared group time slot). The devices use a contention-based access method (modified CSMA-CA) and a simple addressing scheme with 8-bit addresses in shared group time slots. Multiple adjacent base time slots may be concatenated to a single, larger time slot.

The data time slots may be further divided into two parts: uplink time slots and bidirectional time slots. The LLDN mechanism of the IEEE 802.15.4 standard brings many benefits for certain applications. These applications require low-latency and reliable periodic transmissions from sensor devices (such as ECG sensors) to the PAN coordinator. The LLDN superframe structure allows usage of implicit addressing, which greatly reduces the MAC control overhead. It also provides guaranteed channel access at a LLDN device's pre-assigned time slot, so that critical sensor data may be reported to the coordinator in a timely manner.

Figure 4:
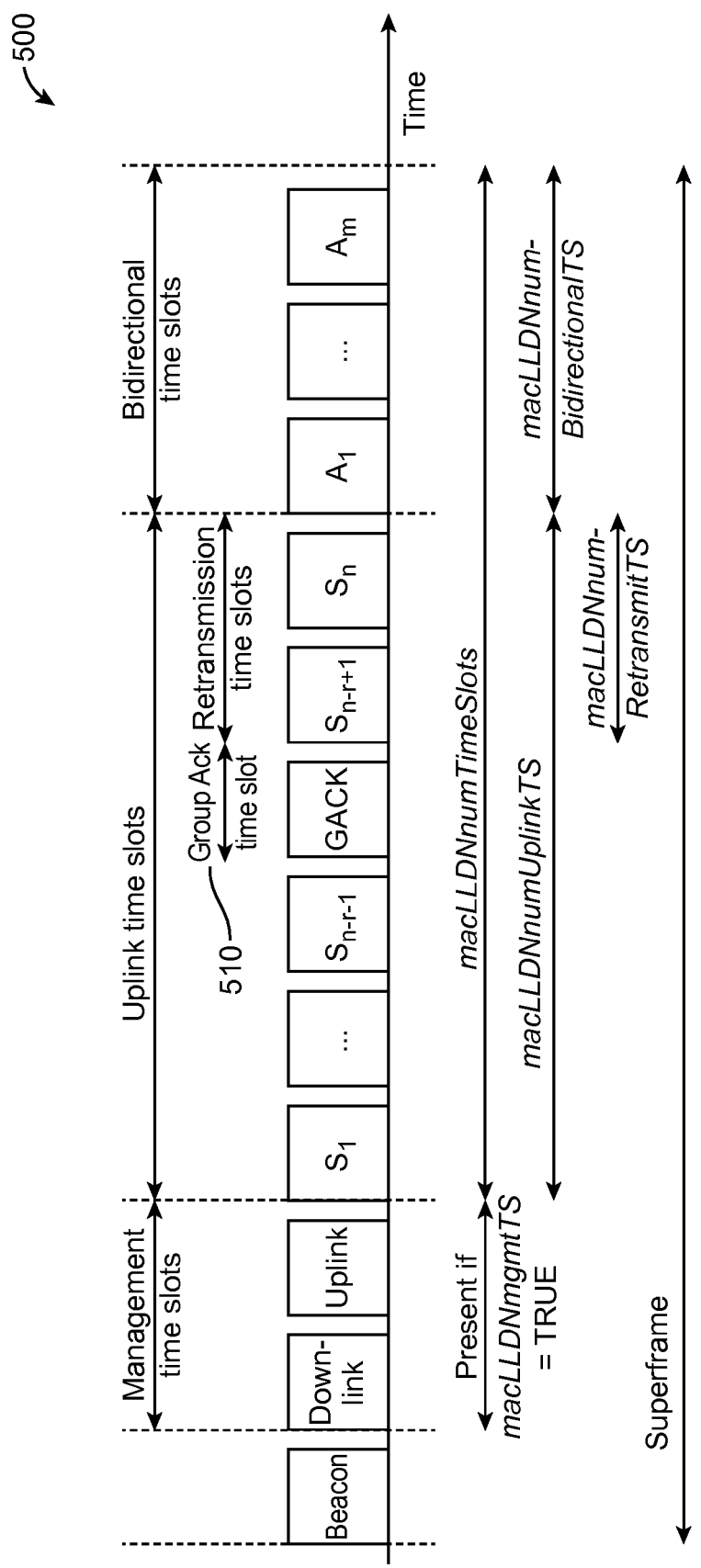
FIG. 4 shows an example LLDN superframe with dedicated time slots including a Group Acknowledgement (GACK) time slot.
Figure 5:
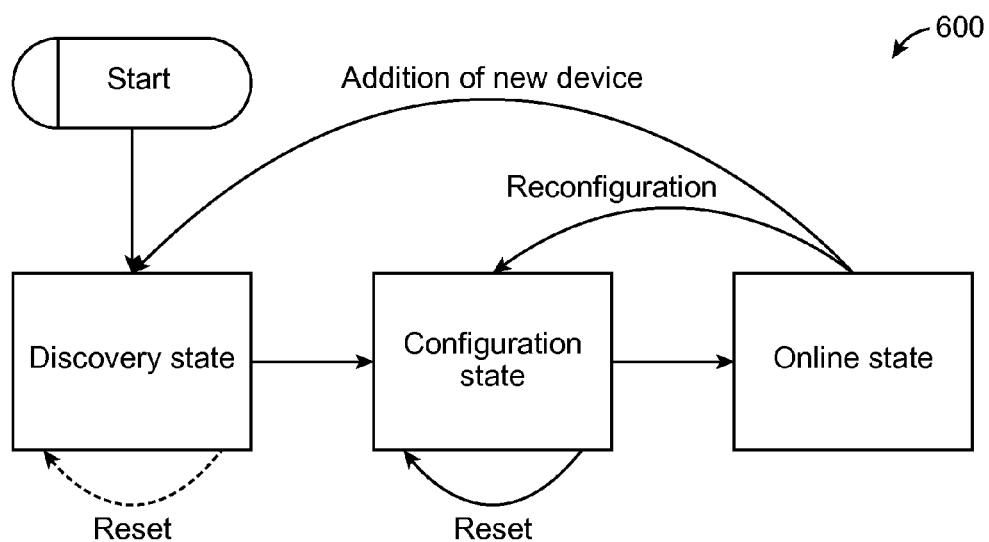
FIG. 5 shows LLDN device transitions among different transmission states.

FIG. 4 shows an example LLDN superframe 500 with dedicated time slots including a Group Acknowledgement (GACK) time slot that may be used by one or more embodiments. The superframe 500 includes macLLDNnumUplinkTS uplink time slots (unidirectional communication, from LLDN devices to the LLDN Coordinator), and macLLDNnumRetransmitTS time slots at the beginning that may be reserved for retransmissions according to the GACK field contained in the LL beacon. It is also possible to use a separate GACK frame in order to facilitate retransmissions of failed transmissions in the uplink time slots within the same superframe 500. The use of a separate GACK frame is configurable during configuration state (FIG. 5). If the use of a separate GACK is configured for superframe 400, the structure of the superframe 500 is the result.

The GACK frame contains a bitmap to indicate successful and failed uplink transmissions in the same order as the uplink transmissions. In this case, retransmission time slots immediately follow the GACK time slot. Superframe 500 further includes macLLDNnumBidirectionalTS bidirectional time slots for either uplink or downlink communication. The Transmission Direction field of the Flags field in the LL beacon indicates the transmission direction of all bidirectional time slots during this superframe 500. If the Transmission Direction field is set to zero, the direction of all bidirectional time slots is uplink. If the Transmission Direction field is set to one, the direction of all bidirectional time slots is downlink. Note that the bidirectional time slots are mainly used for the PAN coordinator to transmit downlink frames to the devices.

The transmission directions of the bidirectional time slots alternate with each LLDN superframe 500. For example, if the transmission direction of the bidirectional time slots of this superframe 500 is downlink, then the transmission direction of the bidirectional time slots of the next superframe 500 must be uplink for the devices to transmit the LL-Acknowledgment frame back to the PAN coordinator. In addition, the transmission of the LL-Acknowledgement frame shall commence in the same bidirectional time slot the LL-Data was received, in the next superframe 500.

LLDN devices that did not receive a data frame from the LLDN PAN coordinator during the bidirectional time slot may send data frames to the LLDN PAN coordinator during this superframe 500 with the Transmission Direction bit set to uplink. The data frame will be acknowledged in the LL beacon of the next superframe 500.

FIG. 5 shows an LLDN device transition diagram 600 showing the different transmission states, as used by one or more embodiments. An LLDN device operates in one of the three states, discovery, configuration and online. The discovery state is the first step during network setup; new devices are discovered and configured in the second step, the configuration state. After the successful completion of the configuration state, the network may go into the online state. Data and readings from the LLDN devices may only be transmitted during the online state. In order to reconfigure a network, the configuration state may be started again. The transitions among different states are illustrated in diagram 600.

The discovery state is the first step during LLDN setup or for the addition of new devices to an existing network. In the discovery state, the superframe (e.g., superframe 400/500, FIGS. 3/4) contains only the time slot for the beacon and two management time slots, one downlink and one uplink. A new device scans the different channels until it detects an LLDN PAN coordinator sending beacons that indicate the discovery state. If a new device received a beacon indicating the discovery state, the device attempts to access the medium in the uplink management time slot in order to send a discover response frame to the LLDN PAN coordinator. The discover response frame contains the current configuration of the device. The new device shall repeat sending the discover response frame until it receives an acknowledgment frame for it or the discovery state is stopped by the LLDN PAN coordinator. The LLDN PAN coordinator changes from the discovery state to the configuration state if it did not receive any discover response frames within the number of seconds indicated in the macLLDNdiscoveryModeTimeout field of the superframe.

The configuration state is the second step during network setup. The configuration state is also used for network reconfiguration. In the configuration state, the superframe contains only the time slots for the beacon and two management time slots, one downlink and one uplink. If a device received a beacon indicating the configuration state, the device tries to get access to the transmission medium in the uplink management time slot in order to send a configuration status frame to the LLDN PAN coordinator. The configuration status frame contains the current configuration of the device. The new device shall repeat sending the configuration status frame until it receives a configuration request frame or the configuration state is stopped by the LLDN PAN coordinator. The configuration request frame contains the new configuration for the receiving device. After successfully receiving the configuration request frame, the device sends an acknowledgment frame to the LLDN PAN coordinator.

User data is only sent during the online state. The superframe starts with a beacon and is followed by several time slots. The devices may send their data during the time slots assigned to them during the configuration state. The existence and length of management time slots in the online state are indicated by the configuration request frame. Once entering the online state, the configuration will remain unchanged until the network enters the configuration state again. The successful reception of data frames by the LLDN PAN coordinator is acknowledged in the GACK bitmap of the LL beacon frame of the next superframe, or in a separate Data Group Acknowledgment frame. This is the case for both uplink time slots and bidirectional time slots if the transmission direction is uplink.

If retransmission time slots are configured (i.e., macLLDNnumRetransmitTS>0), the retransmission slots are assigned to the owners of the first macLLDNnumRetransmitTS with the corresponding bit in the group acknowledgment bitmap set to zero. Each LLDN device shall execute an algorithm in order to determine its retransmission time slot. The LLDN PAN coordinator has to execute a similar algorithm in order to determine the senders of the frames in the retransmission slots. Note that a retransmission is possible if the number of failed transmissions (NFT) is less than macLLDNnumRetransmitTS. If the NFT is equal or greater than macLLDNnumRetransmitTS, a retransmission is not possible since there is not enough pre-allocated retransmission time slots.

The successful reception of data frames by LLDN devices assigned to bidirectional time slots (transmission direction is downlink) is acknowledged by an explicit acknowledgment frame by the corresponding LLDN devices in the following superframe. This means that after setting the Transmission Direction bit in the beacon to downlink and sending a data frame to one or more LLDN devices, the LLDN PAN coordinator shall set the Transmission Direction bit to uplink in the directly following superframe. LLDN devices assigned to bidirectional time slots that have successfully received a data frame from the LLDN PAN coordinator during the previous superframe shall send an acknowledgment frame to the LLDN PAN coordinator. LLDN devices that did not receive a data frame from the LLDN PAN coordinator, may send data frames to the LLDN PAN coordinator during this superframe with the Transmission Direction bit set to uplink.

Figure 6:
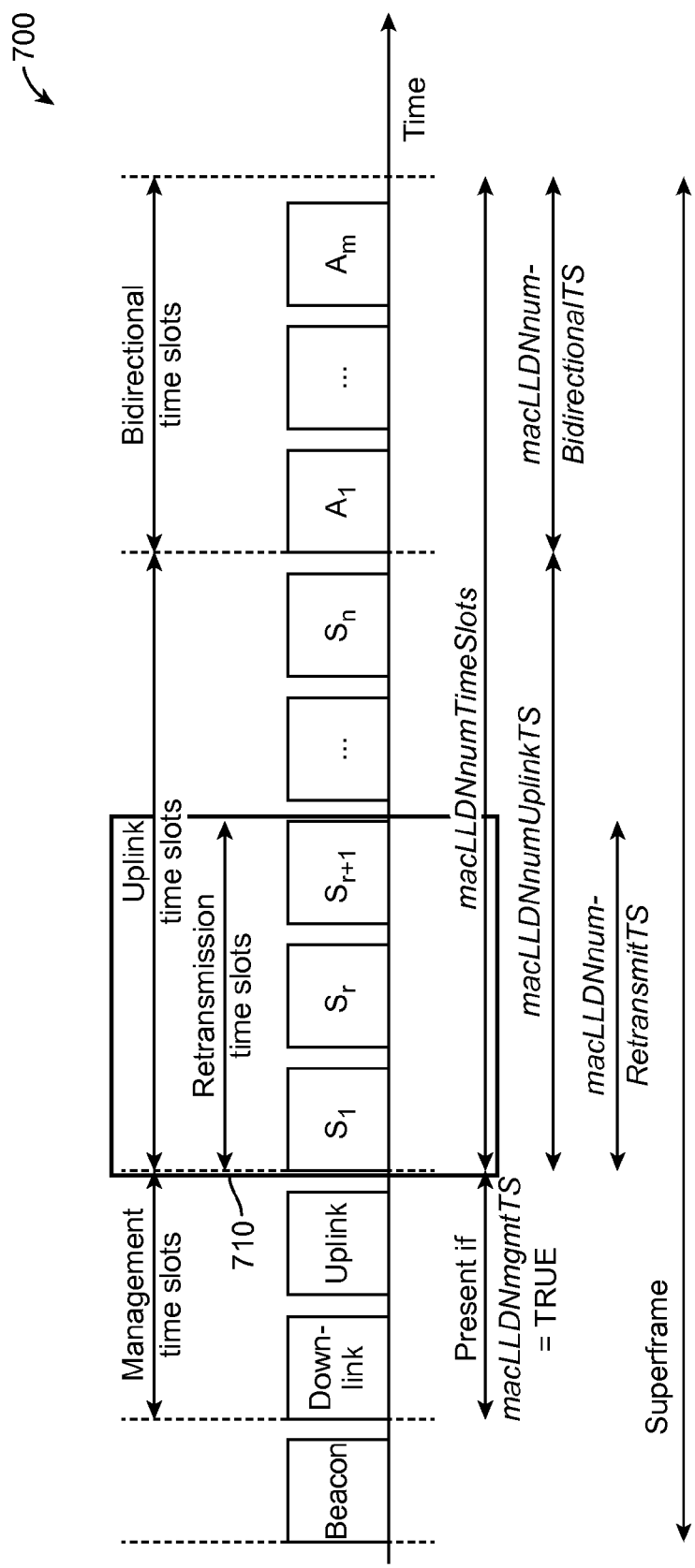
FIG. 6 shows a superframe with dedicated time slots and a first approach for retransmission.

FIG. 6 shows a superframe 700 with dedicated time slots and a first approach for retransmission, as used by one or more embodiments. The superframe 700 does not include the GACK time slot. The first approach for retransmission uses the time slots $S_1$ $S_r$ and $S_{r+1}$ as indicated by the square box.

Figure 7:
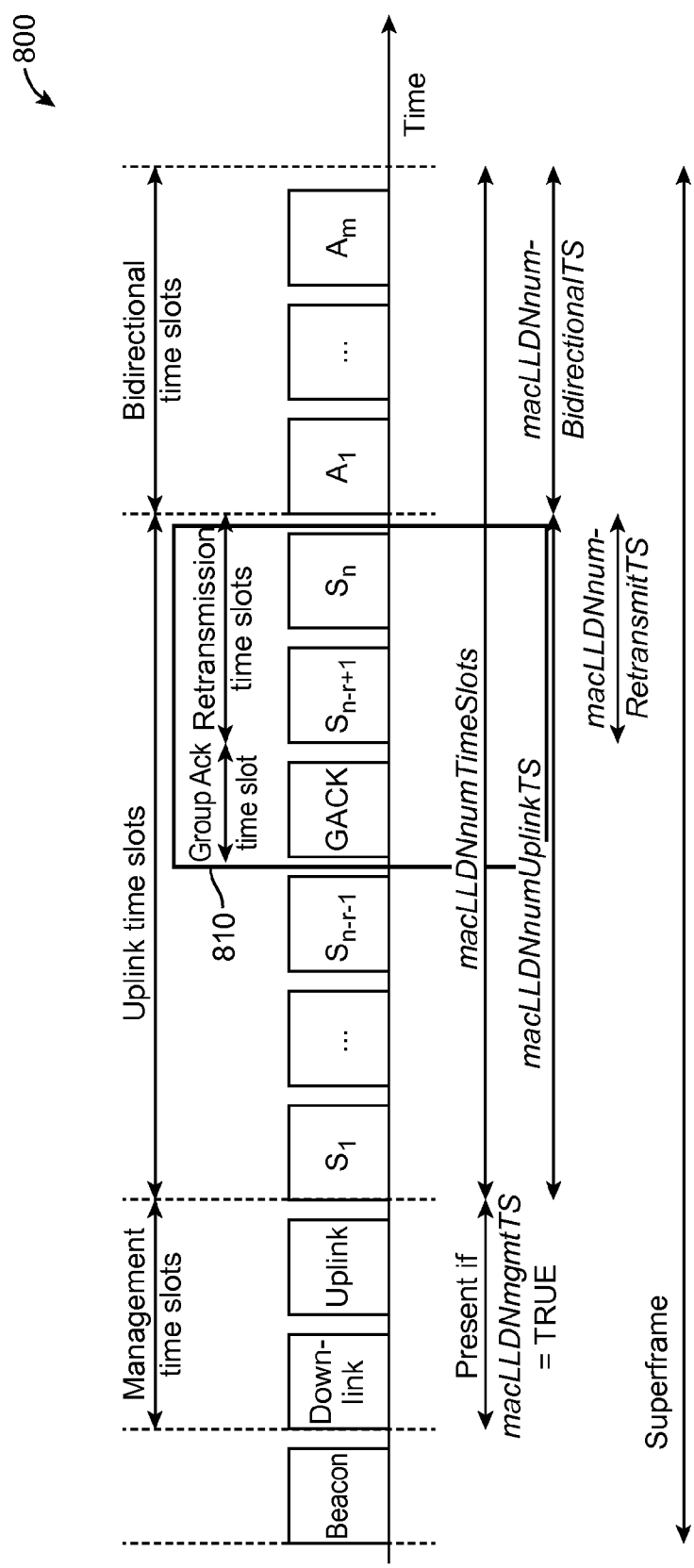
FIG. 7 shows a superframe with dedicated time slots and a GACK time slot, and a second approach for retransmission.

FIG. 7 shows a superframe 800 with dedicated time slots and a GACK time slot, and a second approach for retransmission, as used by one or more embodiments. The superframe 800 includes the GACK time slot. The second approach for retransmission uses the time slots GACK, $S_{n-r+1}$ and $S_n$ as indicated by the square box.

Figure 8:
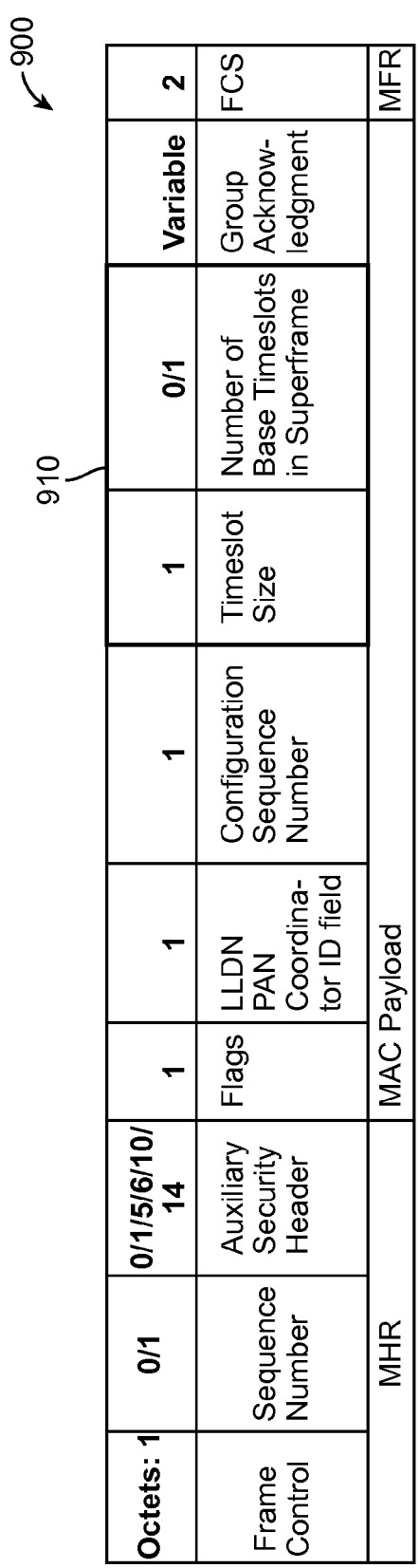
FIGS. 8-9 show a format for a low latency (LL) beacon frame.
Figure 9:
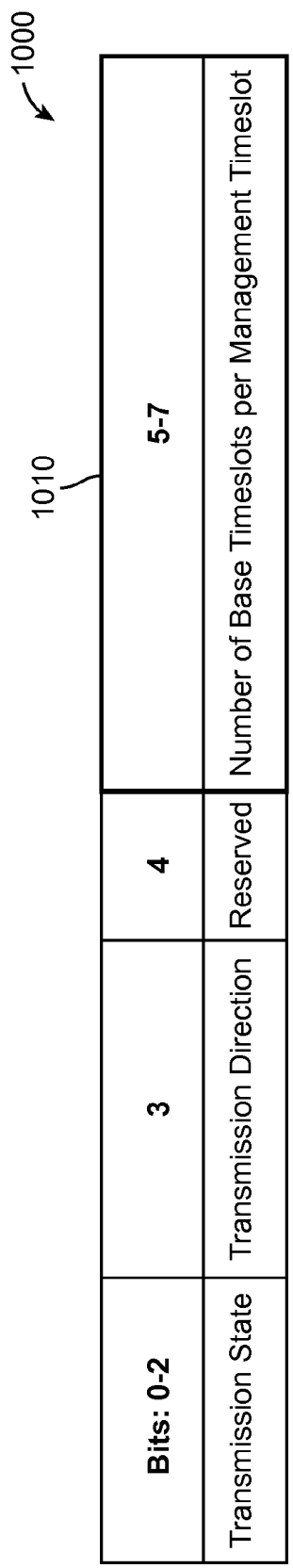

FIGS. 8-9 show a format for a typical LL beacon frame 900 and 1000. The LL beacon frame shown in 900 and 1000 carries enough information for determining the beacon interval and superframe length. As indicated by the boxes, the beacon frame 900 and 100 includes fields for time slot size, the number of base time slots in the superframe (not including beacon time slot and management time slots), and the number of base time slots per management time slot.

Figure 10:
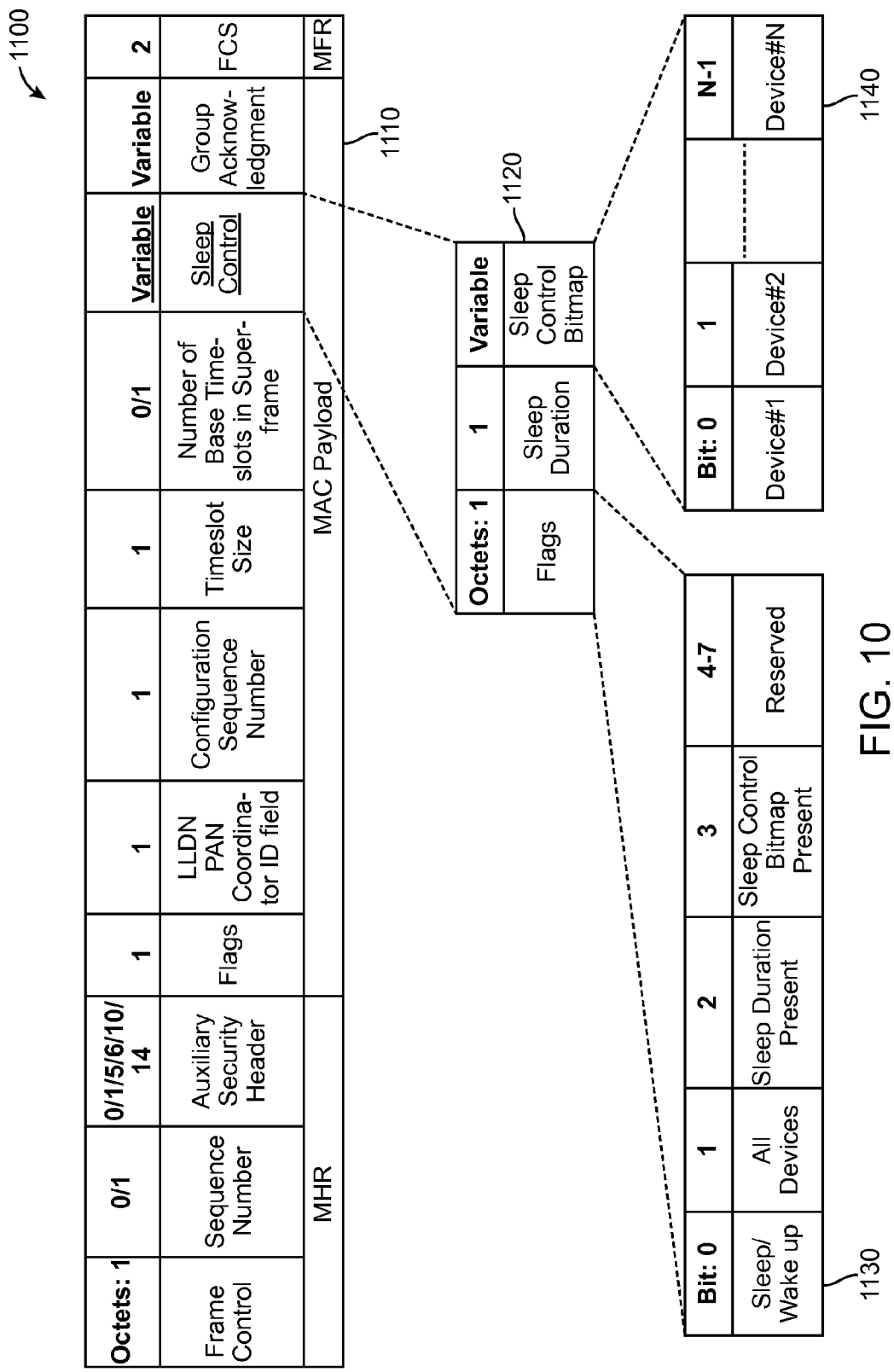
FIG. 10 shows a format for a modified LL-beacon frame, according to an embodiment.

FIG. 10 shows a format 1100 for a modified LL beacon frame 1110, according to an embodiment. In one embodiment, the LL beacon frame 1110 includes an additional field for sleep control. In one embodiment, the sleep control field 1120 includes three sub-fields: flags, sleep duration and sleep control bitmap. In one embodiment, the flags sub-field 1130 includes multiple sub-fields including a reserved sub-field. In one embodiment, the sleep/wake up sub-field has one bit in length and indicates whether the devices shall sleep or wake up after processing the beacon 1110. In one embodiment, when the sleep/wake up bit is set to 0, the requested action is to sleep right after receiving the LL beacon frame 1110; when the sleep/wake up bit is set to 1, the requested action is to wake up from the received LL beacon frame 1110 and remain awake until the next LL beacon frame 1110 places the device(s) into a sleep state again.

In one embodiment, the All Devices sub-field indicates whether the sleep/wakeup action applies to all devices in the LLDN or just some of the devices in the LLDN. In one embodiment, when the All Devices sub-field is set to 1, the sleep/wakeup action applies to all devices in the LLDN and the Sleep Control Bitmap sub-field 1140 may be ignored. In one embodiment, when the All Devices sub-field is set to 0, the sleep/wakeup action applies to some devices and the Sleep Control Bitmap sub-field needs to be processed to determine which devices need to take the action indicated in the Sleep/Wake up sub-field.

In one embodiment, the Sleep Duration Present sub-field indicates whether the Sleep Duration information will be present later in the sleep control field 1120. In one embodiment, the Sleep Duration sub-field does not need to be present when the action is set to Wake up. In one embodiment, the Sleep Duration sub-field is present when the action is set to Sleep.

In one embodiment, the Sleep Control Bitmap Present sub-field indicates whether the Sleep Control Bitmap sub-field will present later in the sleep control field 1120. In one embodiment, the Sleep Control Bitmap sub-field in the sleep control field 1120 does not need to be present when the All Devices sub-field is set to 1. In one embodiment, the Sleep Control Bitmap sub-field is present when the All Devices sub-field is set to 0. In one embodiment, Bits 4 to 7 of the flags sub-field 1130 are reserved for future use.

In one embodiment, the Sleep Duration field of the sleep control field 1120 determines the duration of the sleeping period. In one embodiment, the duration is measured based on the number of a superframe length, and ranges from 0 to 255. In one example embodiment, a value of 10 means that devices should sleep for 10 superframes before waking up to check the next LL beacon frame 1110. Note this sub-field only applies to the Sleep action, not to the Wake up action.

In one embodiment, the Sleep Control Bitmap sub-field of the sleep control field 1120 indicates the devices to which the Sleep/Wake up actions apply. In one embodiment, each device is represented by one bit in the bitmap, and the position of each bit equals to the time slot number that the device is assigned minus one. In one example embodiment, if a device is assigned time slot #n, this device is represented by Bit (n−1) in the bitmap. When the bit is set to 1, it means the Sleep/Wake up action applies to this device. When the bit is set to 0, it means the Sleep/Wake up action does not apply to this device.

In one embodiment, when using a specific command frame, the command frame shall carry the Sleep Control field shown in LL beacon frame 1110 in its command frame payload. In one embodiment, the command frame needs to be assigned a new frame sub-type. In one embodiment, the destination address of the command frame shall be set to the broadcast address so all devices need to process it. In one embodiment, the command frame may be transmitted either in the downlink management time slots or in the bidirectional time slots (when the transmit direction is set to downlink).

In one embodiment, once entering the power save mode during the configuration state, an LLDN device that is configured for power saving capability (e.g., able to sleep/wake) may switch between two power save states, the Active state and the Sleep state, during the Online state. In one embodiment, a device may enter the Sleep state based on different factors. In one embodiment, the following factors need to be considered when determining the time to enter a Sleep state and how long the sleeping duration would be for a device in power save mode: whether the management time slots present; whether the retransmission time slots present; what is the assigned uplink time slot for this device; whether the Group ACK time slot present (if yes, does this device have a failed transmission that needs to be retransmitted (if yes, what is the assigned time slot for this device to retransmit)); whether the bidirectional time slots are present (if yes, are these uplink or downlink time slots (if uplink, does this device assign a time slot for transmission).

In one embodiment, an LLDN power save device should enter Sleep state at the following moments:
1) at the end of LL Beacon frame 1110, if management time slots are not present in the superframe;
2) at the end of management time slots if present in the superframe;
3) at the end of the device's assigned retransmission time slots, if it needs to retransmit, as indicated in the LL Beacon frame 1110;
4) at the end of the device's assigned uplink transmission time slots in the superframe;
5) at the end of the GACK time slot, if it is not scheduled to retransmit at the time slot immediately after the GACK time slot in the superframe;
6) at the end of its own retransmission time slot after the GACK time slot in the superframe; and
7) at the end of its assigned bidirectional time slot in the superframe.

In one embodiment, if the transmission direction is set to uplink, an LLDN power save device should enter the Active state (i.e., wake up) at the following moments:
1) before its assigned retransmission time slot in the superframe, if it needs to retransmit;
2) before its assigned uplink transmission time slot in the superframe;
3) before the GACK time slot if the GACK is configured in the superframe;
4) before its own retransmission time slot after the GACK time slot in the superframe;
5) before the bidirectional time slot if the device is configured as downlink in the superframe;
6) before its own bidirectional time slot if configured as uplink and this device has been assigned a bidirectional time slot in the superframe; and
7) before the next LL beacon frame 1110 in the superframe.

In one embodiment, in an LLDN the PAN coordinator has two options for acknowledging transmitted frames by the devices, using the Group Acknowledgement field in the LL beacon frame 1110 or using a separate Group Acknowledgement frame in the Group ACK time slot in the uplink time slot period (this Group ACK time slot itself is a downlink time slot). In one embodiment, the LL beacon frame 1110 in the LLDN always carries the GACK field even if a separate GACK frame is used.

In one embodiment, the devices and the PAN coordinator need to exchange information, such as whether the devices support the LLDN power save feature, and when the devices want to enter or exit the power save mode. In one embodiment, an LLDN device reports its LLDN power save capability during the Discovery State. In one embodiment, in the discovery state, a new device scans different channels until it detects an LLDN PAN coordinator sending beacons that indicate Discovery state. In one embodiment, if a new device received an LL beacon frame 1110 indicating Discovery state, it attempts to access the medium in the uplink management time slot in order to send a Discover Response frame to the LLDN PAN coordinator.

In one embodiment, the Discovery Response frame contains current configuration of the device. In one embodiment, the Discovery Response frame is a command frame that is formatted as illustrated in Table I.

TABLE I

| Octets: 1 | Variable |
|---|---|
| Command Frame Identifier | Discovery Parameters |

In one embodiment, to report the LLDN power save capability, a parameter, LLDN Power Save Capability, is added to the typical list of parameters. In one embodiment, the data type of the LLDN Power Save Capability parameter may be Boolean, where a value of TRUE indicates the device has capability of LLDN power save, while a value of FALSE indicates the device is not capable of LLDN power save. In one embodiment, the modified discovery parameter list is as follows:
1) full MAC address;
2) required time slot duration, which is defined by the application of the device (e.g., size of payload data);
3) uplink/bidirectional type indicator; and
4) LLDN Power Save Capability.

In one embodiment, an LLDN device that desires to operate in the power save mode indicates this capability to the PAN coordinator using the Discovery Response frame during the Discovery State. In one embodiment, an LLDN device enters/exits the power save mode by informing the coordinator and receiving a confirmation from the coordinator during the Configuration State. In one embodiment, when a device that received a beacon indicating the configuration state, the device tries to get access to the transmission medium in the uplink management time slot in order to send a Configuration Status frame to the LLDN PAN coordinator. In one embodiment, the Configuration Status frame is a command frame that contains the configuration parameters that are currently configured at the device as input for the configuration process in an LLDN, as illustrated in Table II.

TABLE II

| Octets: 1 | Variable |
|---|---|
| Command Frame | Configuration Parameters |

In one embodiment, to enter/exit the LLDN power save mode, an additional parameter is added to the typical parameter list, which is the LLDN Power Save Mode parameter. In one embodiment, the data type of the added parameter may be Boolean, where a value of TRUE indicates the device is requesting entering the LLDN power save mode, while a value of FALSE indicates the device is requesting exiting the LLDN power save mode (or has no intend to enter the power save mode even if it has the capability.). In one embodiment, the modified configuration parameter list is as follows:
1) full MAC address;
2) short MAC address;
3) required time slot duration, which is defined by the application of the device (e.g., size of payload data);
4) uplink/bidirectional data communication assigned time slots; and
5) LLDN Power Save Mode.

In one embodiment, upon receiving the Configuration Status command frame from an LLDN device, the coordinator needs to decide whether it will allow the device to enter or exit the power save mode. In one embodiment, the PAN coordinator achieves this by sending a Configuration Request command frame back to the requesting LLDN device in the Configuration State. In one embodiment, the command payload of the Configuration Request frame is illustrated in Table III.

TABLE III

| Octets: 1 | Variable |
|---|---|
| Command Frame Identifier | Configuration Parameters |

In one embodiment, the Configuration Request command contains the configuration parameters that the receiving device shall use during the Online state. In one embodiment, this command is only be sent by an LLDN PAN coordinator in response to a received Configuration Status frame of a device during the Configuration state.

In one embodiment, to allow/disallow a device to enter/exit the LLDN power save mode, an additional parameter is added to the typical parameter list. In one embodiment, the additional parameter is the LLDN Power Save Mode parameter. In one embodiment, the data type of the LLDN Power Save Mode parameter may be Boolean, where a value of TRUE indicates the device is granted the right of entering the LLDN power save mode, while a value of FALSE indicates the device is not allowed to enter the LLDN power save mode (or its request to exit the power save mode is confirmed). In one embodiment, the modified configuration parameter list is as follows:
1) full MAC address;
2) short MAC address;
3) transmission channel;
4) existence of management frames;
5) time slot duration;
6) assigned time slots;
7) LLDN Power Save Mode.

Figure 11:
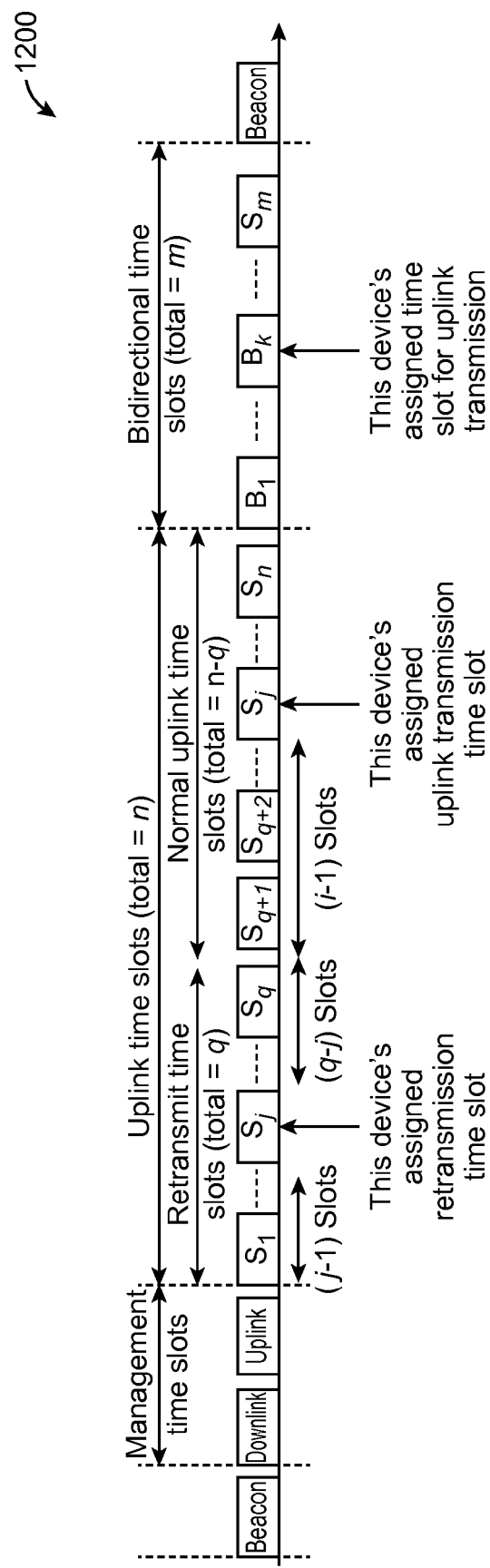
FIG. 11 shows a superframe structure without presence of a GACK time slot showing availability for determining sleep durations, according to an embodiment.

FIG. 11 shows a superframe structure 1200 without presence of a GACK time slot showing availability for determining sleep durations, according to an embodiment. In one example embodiment, for ease of discussion hereafter, Sleep_Duration represents the duration that a device sleeps during the sleep state (e.g., an LLDN wireless device in power save mode). In one example embodiment, all of the time slots are equal in length and the duration of a single time slot is represented by TS_Duration. In one embodiment, the TS-Duration is pre-configured in the Configuration state, in the Configuration Request frame sent by the PAN coordinator (e.g., the "Timeslot duration" parameter).

Figure 12:
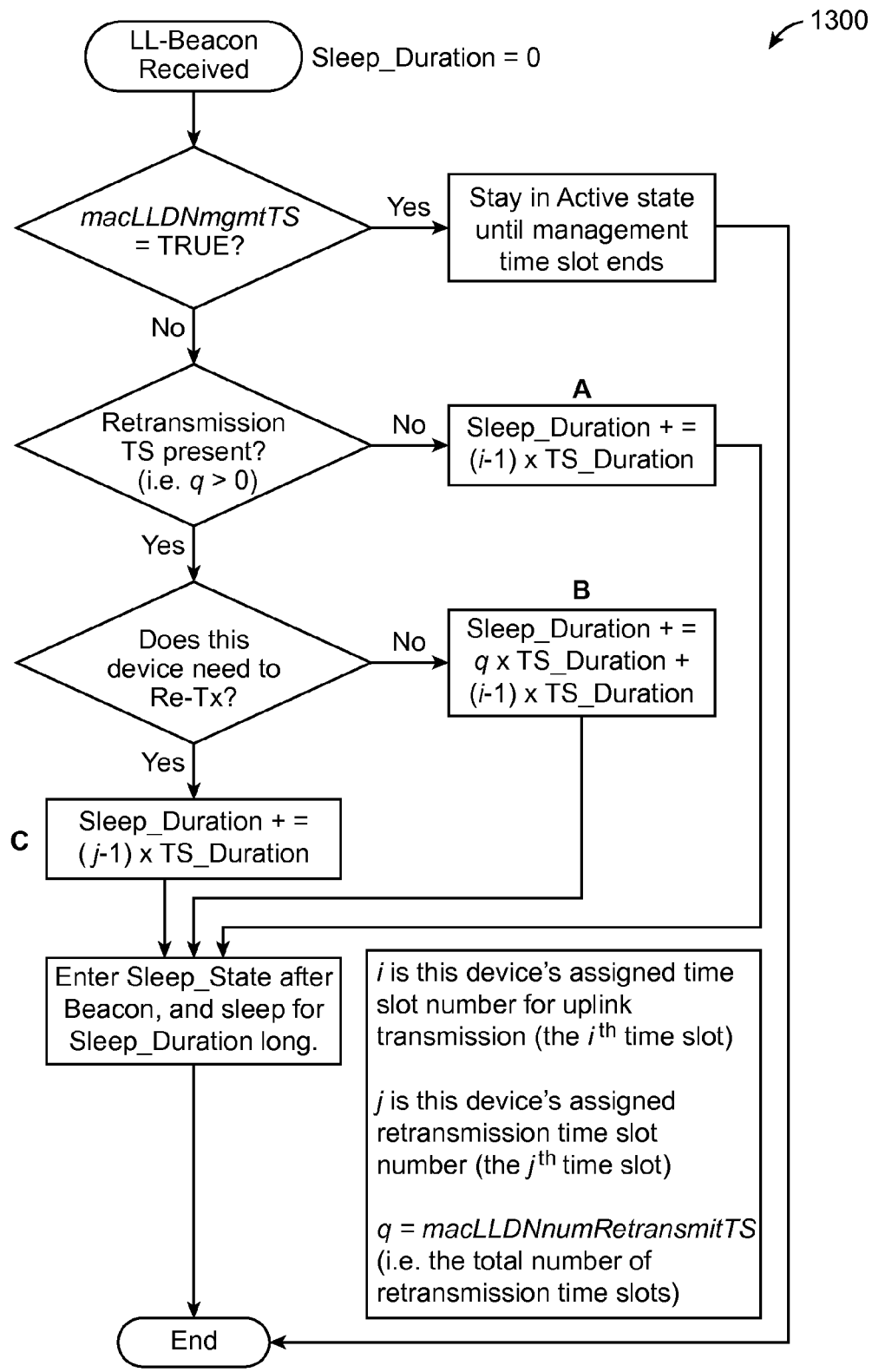
FIG. 12 shows a flow diagram for determining sleep duration at an end of an LL beacon frame communication, according to an embodiment.
Figure 13:
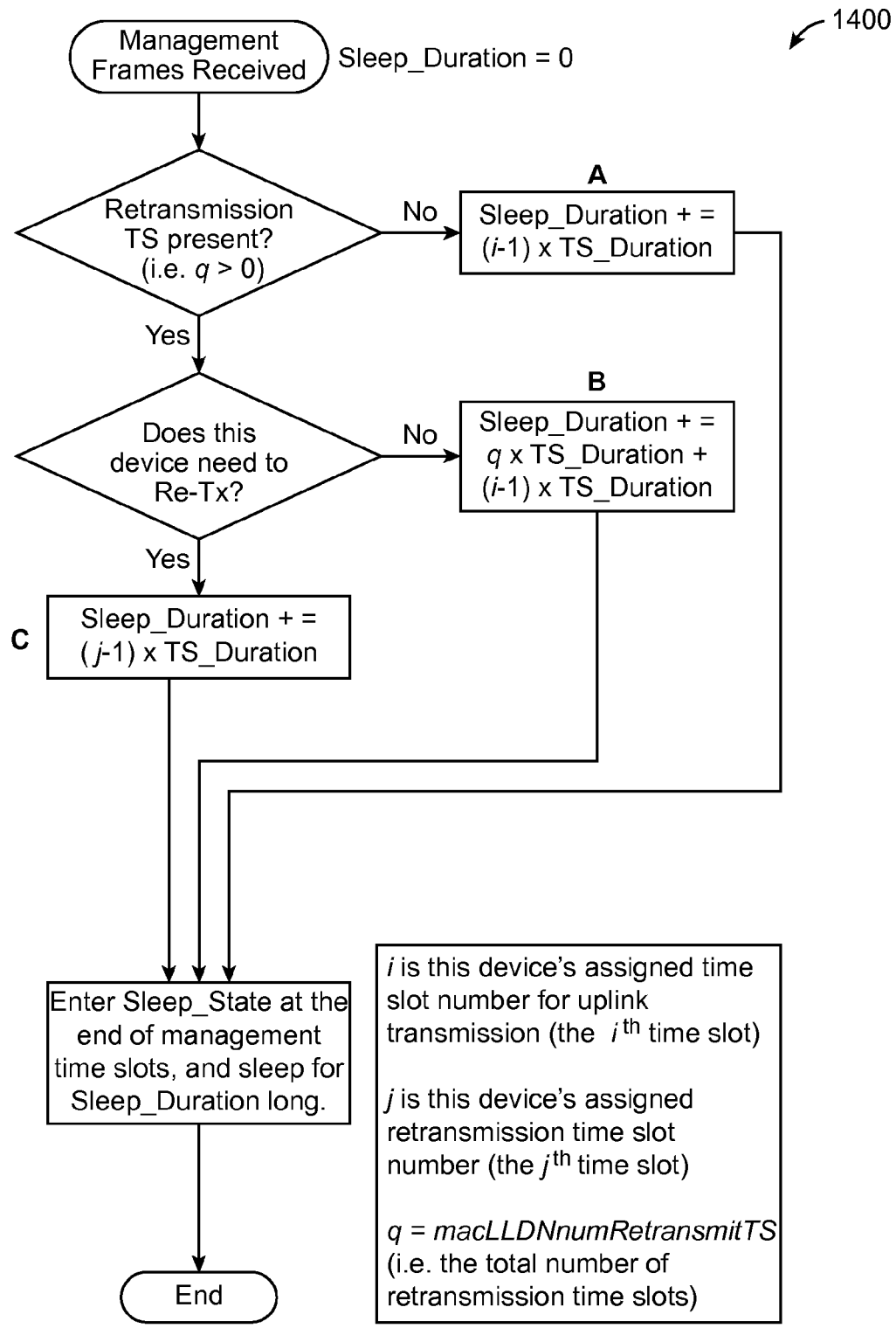
FIG. 13 shows a flow diagram for determining sleep duration at an end of management time slots of a superframe communication, according to an embodiment.
Figure 14:
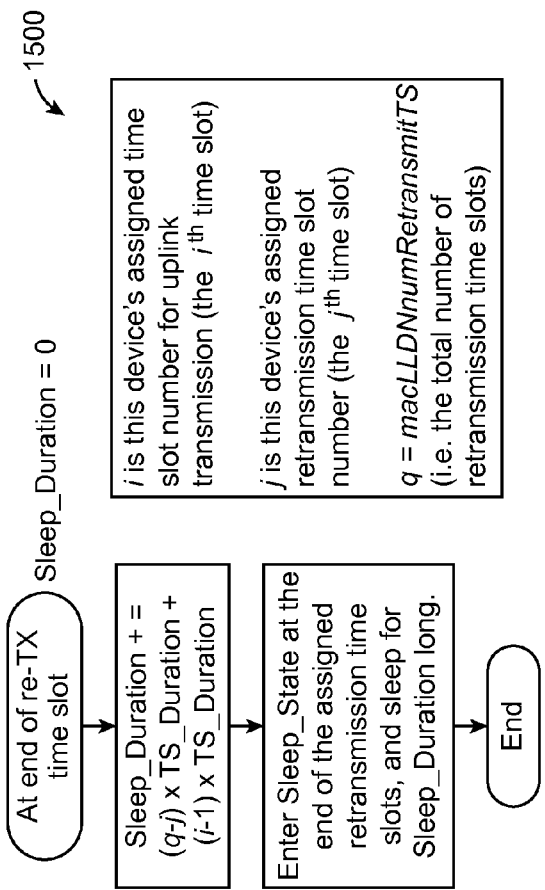
FIG. 14 shows a flow diagram for determining sleep duration at an end of an assigned retransmission time slot of a superframe communication, according to an embodiment.

In one embodiment, to assist in describing the flow charts shown in FIGS. 12-14, the superframe structure 1200 is used when the GACK field is present in the LL beacon frame and the Group ACK time slot is not present in the superframe structure 1200. In one example embodiment, the availabilities of numbers used for determining the sleeping duration in the superframe structure 1200 are listed below as follows:
n=macLLDNnumUplinkTS, which is a MAC PIB attribute;
m=macLLDNnumBidirectionalTS, which is a MAC PIB attribute;
q=macLLDNnumRetransmitTS, which is a MAC PIB attribute;
j=A device's assigned retransmission time slot, which may be calculated from the Group Acknowledgement field of the LL beacon;
i=A device's assigned transmission time slot, which is pre-configured in the Configuration state, in the Configuration Request frame sent by the PAN coordinator (the "Assigned timeslot" parameter);
k=the order of the time slot during which the device received the downlink LL-data frame from the PAN coordinator. For example, if a device received the LL-data at the 3rd bidirectional time slot, then it needs to transmit the uplink LL-Acknowledgement frame at the 3rd bidirectional time slot in the next superframe.

FIG. 12 shows a flow diagram 1300 for determining sleep duration at an end of an LL beacon frame communication, according to an embodiment. In one embodiment, after receiving and processing the LL beacon frame 1110, an LLDN power save device decides whether to enter the Sleep state and, if it does, how long the Sleep_Duration would be. The flow diagram 1300 shows the functional flow for determining sleep duration at the end of an LL beacon frame 1110. Note that the power save device may wake up for different events, such as:
1) if there is no retransmission time slots configured in the superframe 1200, the device will wake up before its assigned uplink transmission time slot (Sleep_Duration calculated in Box A in flow diagram 1300);
2) if retransmission time slots are present but this device does not need to retransmit, the device will wake up before its assigned uplink transmission time slot (Sleep_Duration calculated in Box B in flow diagram 1300);
3) if retransmission time slots are present and this device needs to retransmit, the device will wake up before its assigned retransmission time slot (Sleep_Duration calculated in Box C in flow diagram 1300).

In the flow diagram 1300, i is this device's assigned time slot number for uplink transmission (the $i^{th}$ time slot); j is the device's assigned retransmission time slot number (the $j^{th}$ time slot); q=macLLDNnumRetransmitTS (i.e., the total number of retransmission time slots). In one embodiment, the flow diagram 1300 begins with receiving the LL beacon frame 1110. In one embodiment, if the macLLDNmngmtTS are present, the device stays in the active state until the management time slot ends, otherwise it is determined whether a retransmission TS is present. In one embodiment, if the retransmission TS is not present, then the sleep duration is determined using box A (i−1×TS_Duration). Otherwise, in one embodiment, it is determined if the device needs to retransmit. In one embodiment, if the device does not need to retransmit, then the sleep duration is determined using box B (q×TS_Duration+(i−1)×TS_Duration). In one embodiment, if it is determined that the device does need to retransmit, the sleep duration is set to (j−1)×TS_Duration in box C. The device then enters the sleep state after the LL beacon frame 1110 and sleeps for the determined sleep duration.

FIG. 13 shows a flow diagram 1400 for determining sleep duration at an end of management time slots of a superframe communication, according to an embodiment. In one embodiment, after receiving and processing the management frames, an LLDN power save device determines whether to enter the sleep mode at the end of the management time slots and, if it does, how long the Sleep_Duration will be. The flow diagram 1400 shows the functional flow for determining sleep duration at the end of the management time slots of the superframe 1200. In one embodiment, note that the power save device may wake up for different events, such as:
1) if there is no retransmission time slots configured, the device will wake up before its assigned uplink transmission time slot (Sleep_Duration calculated in Box A in flow diagram 1400);

2) if retransmission time slots present but this device does not need to retransmit, the device will wake up before its assigned uplink transmission time slot (Sleep_Duration calculated in Box B in flow diagram 1400);
3) if retransmission time slots present and this device needs to retransmit, the device will wake up before its assigned retransmission time slot (Sleep_Duration calculated in Box C in flow diagram 1400).

In the flow diagram 1400, i is this device's assigned time slot number for uplink transmission (the ith time slot); j is the device's assigned retransmission time slot number (the jth time slot); q=macLLDNnumRetransmitTS (i.e., the total number of retransmission time slots). In one embodiment, the flow diagram 1400 begins with receiving the management frames. In one embodiment, if the retransmission TS are not present, then the sleep duration is determined using box A (i−1×TS_Duration). Otherwise, in one embodiment, it is determined if the device needs to retransmit. In one embodiment, if the device does not need to retransmit, then the sleep duration is determined using box B (q×TS_Duration+(i−1)×TS_Duration). In one embodiment, if it is determined that the device does need to retransmit, the sleep duration is set to (j−1)×TS_Duration in box C. The device then enters the sleep state after the end of the management time slots and sleeps for the determined sleep duration.

FIG. 14 shows a flow diagram 1500 for determining sleep duration at an end of an assigned retransmission time slot of a superframe communication, according to an embodiment. In one embodiment, after transmitting at the assigned retransmission time slots, an LLDN power save device decides whether to enter Sleep state at the end of its retransmission time slots and, if it does, how long the Sleep_Duration will be. The flow diagram 1500 shows the functional flow for determining sleep duration at the end of the assigned retransmission time slots of the superframe 1200.

In the flow diagram 1500, i is this device's assigned time slot number for uplink transmission (the ith time slot); j is the device's assigned retransmission time slot number (the jth time slot); q=macLLDNnumRetransmitTS (i.e., the total number of retransmission time slots). In one embodiment, the flow diagram 1400 begins the end of the retransmission time slot (where the sleep duration is set to 0. In one embodiment, the LLDN power save device will sleep during the rest of the retransmission time slots for (q−j)×TS_Duration and the uplink transmission time slots for (i−1)×TS_Duration before its own time slot arrives. Note that an LLDN power save device will always wake up before its assigned uplink time slot to see whether it has anything to transmit to the PAN coordinator. In one embodiment, this is necessary to guarantee low latency communications.

Figure 15:
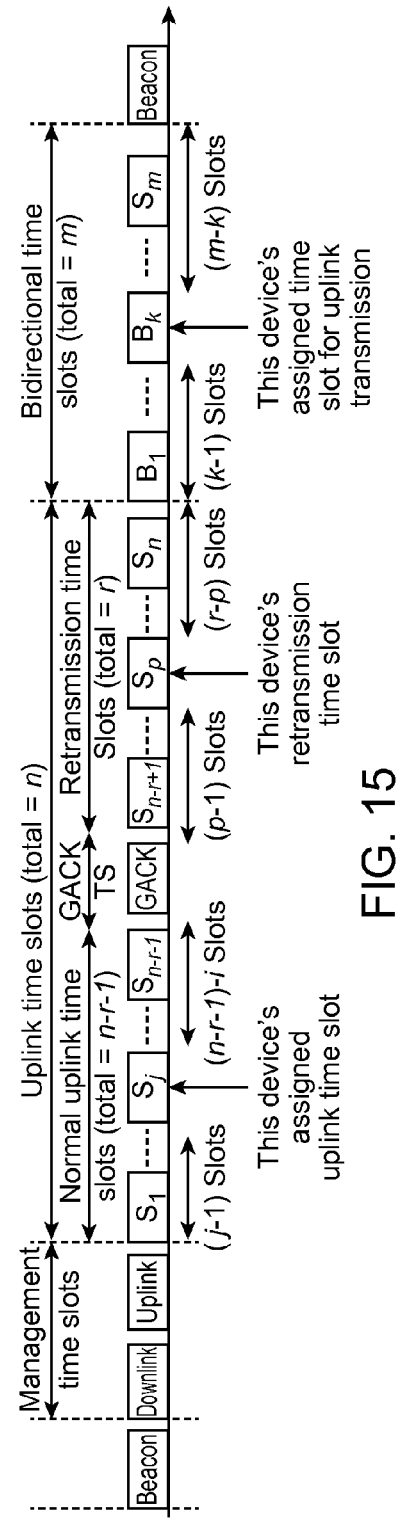
FIG. 15 shows a superframe structure with presence of a GACK time slot showing availability for determining sleep durations, according to an embodiment.

FIG. 15 shows a superframe structure 1600 with presence of a GACK time slot showing availability for determining sleep durations, according to an embodiment. In one embodiment, after transmitting at the assigned uplink transmission time slot, an LLDN power save device decides whether to enter the sleep state at the end of the uplink transmission time slot and, if it does, how long the Sleep_Duration will be. Note that although the IEEE 802.15.4 standard (4e) mentions that the use of a separate GACK is configurable during configuration mode, the standard does not provide the details on how the GACK time slot is assigned. In one example embodiment, it is assumed that an LLDN will use either the GACK field in the LL beacon or the GACK frame in a separate time slot as the acknowledgement method, but not both in an LLDN superframe. In one embodiment, it is assumed that there are r retransmission time slots reversed after the GACK time slot. Therefore, in one embodiment, the GACK time slot is the $(n-r)^{th}$ time slot in the uplink time slots, where n is the total number of uplink time slots. Note the GACK frame is transmitted in time slot (n−r). The number p may be obtained from the GACK frame received in the Group ACK time slot. Other numbers may also be obtained as described earlier with respect to FIG. 11.

Figure 16:
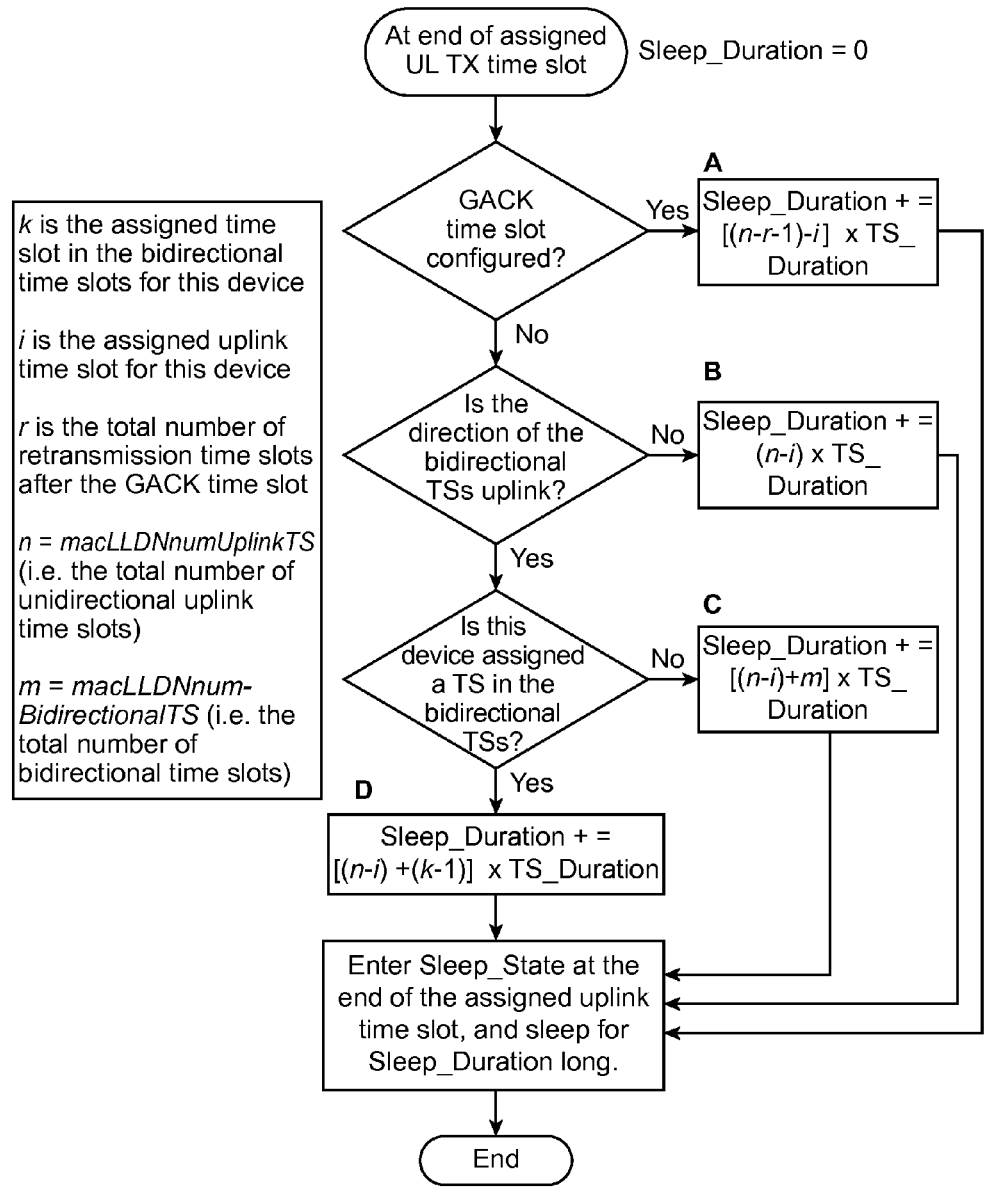
FIG. 16 shows a flow diagram for determining sleep duration at an end of an assigned uplink time slot of a superframe communication, according to an embodiment.

FIG. 16 shows a flow diagram 1700 for determining sleep duration at an end of an assigned uplink time slot of a superframe communication, according to an embodiment. The flow diagram 1700 shows the functional flow for determining sleep duration at the end of an LL beacon frame 1110. In one embodiment, note that the power save device may wake up for different events, such as:

1) if there is no Group ACK time slot configured, the device needs to check the direction of the bidirectional time slots:
   a. if the direction is downlink (from the PAN coordinator to the device), the device needs to wake up before the first bidirectional time slot arrives and remain active during the entire bidirectional period to receive downlink transmissions (although it is possible that the device may not receive any data frame destined to it) (Sleep_Duration is calculated in Box B in flow diagram 1700).
   b. if the direction is uplink:
      i. if the device was assigned an uplink time slot in the bidirectional time slots, the device needs to wake up before its assigned bidirectional time slot (Sleep_Duration is calculated in Box D in flow diagram 1700);
      ii. if the device was not assigned any uplink time slot, the device needs to wake up before next LL beacon (Sleep_Duration is calculated in Box C in flow diagram 1700);
2) if the Group ACK time slot is configured, the device needs to wake up before the Group ACK time slot arrives (Sleep_Duration calculated in Box A in flow diagram 1700.

In the flow diagram 1700, k is the assigned time slot in the bidirectional time slots for the device; i is this device's assigned time slot number for uplink transmission; r is the total number of retransmission time slots after the GACK time slot; n is the macLLDNnumUplinkTS (i.e., the total number of unidirectional uplink time slots); and m is the macLLDNnumBidirectionalTS (i.e., the total number of bidirectional time slots). In one embodiment, the flow diagram 1700 begins at the end of the assigned uplink (UL) transmission time slot, where the sleep duration is set to 0. In one embodiment, next if the GACK time slot is configured, the sleep duration is determined using box A in flow diagram 1700 (sleep_duration+=[(n−r−1)−i]×TS_Duration). In one embodiment, if the GACK time slot is not configured, it is determined if the direction of the bidirectional time slots is uplink.

In one embodiment, if the direction of the bidirectional time slots are not uplink, the sleep duration is determined using box B in flow diagram 1700 (sleep duration+=(n−i)×TS_Duration). In one embodiment, if the direction of the bidirectional time slots are uplink, it is determined if the device is assigned a time slot in the bidirectional time slots. In one embodiment, if the device is not assigned a time slot in the bidirectional time slots, the sleep duration is determined using box C in flow diagram 1700 (Sleep_Duration+=[n−i)+m]×TS_Duration). In one embodiment, if the device is assigned bidirectional time slots, then the sleep duration is determined using the box D in flow diagram 1700 (sleep_duration+=[(n−i)+(k−1)]×TS_Duration). The device then enters the sleep state at the end of the assigned uplink time slot and sleeps for the determined sleep duration.

Figure 17:
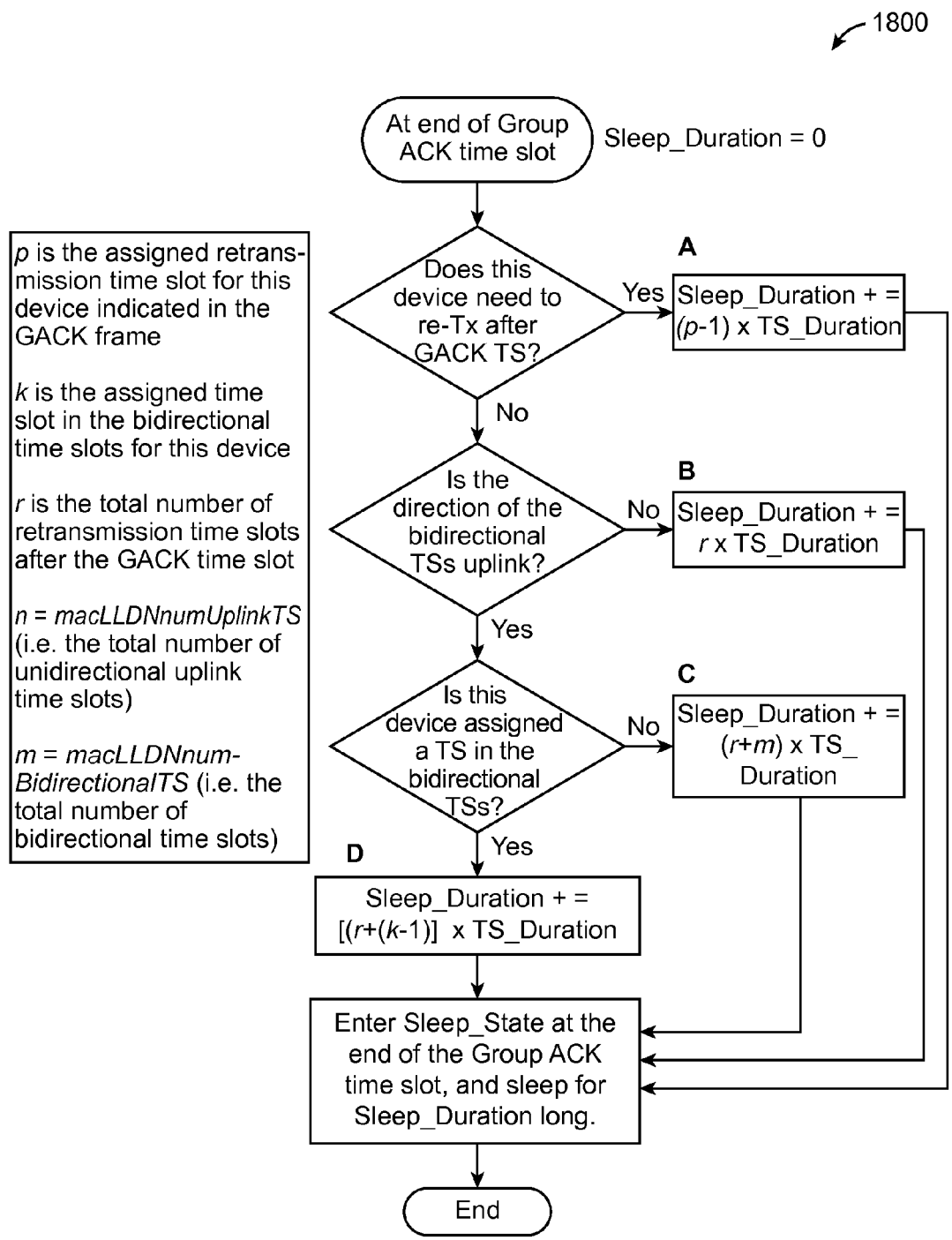
FIG. 17 shows a flow diagram for determining sleep duration at an end of a GACK time slot of a superframe communication, according to an embodiment.

FIG. 17 shows a flow diagram 1800 for determining sleep duration at an end of a GACK time slot of a superframe communication, according to an embodiment. In one embodiment, after receiving the GACK frame from the PAN coordinator in the GACK time slot, an LLDN power save device decides whether to enter a sleep state at the end of the GACK time slot and, if it does, how long the Sleep_Duration will be. The flow diagram 1800 shows the functional flow for determining sleep duration at the end of a GACK time slot.

In the flow diagram 1800, p is the assigned retransmission time slot for the device indicated in the GACK frame; k is the assigned time slot in the bidirectional time slots for the device; r is the total number of retransmission time slots after the GACK time slot; n is the macLLDNnumUplinkTS (i.e., the total number of unidirectional uplink time slots); and m is the macLLDNnumBidirectionalTS (i.e., the total number of bidirectional time slots). In one embodiment, the flow diagram 1800 begins at the end of the GACK time slot, where the sleep duration is set to 0. In one embodiment, next if the device needs to retransmit after the GACK time slot, the sleep duration is determined using box A in flow diagram 1800 (sleep_duration+=(p−1)×TS_Duration). In one embodiment, if the device does not need to retransmit after the GACK TS, it is determined if the direction of the bidirectional time slots is uplink.

In one embodiment, if the direction of the bidirectional time slots are not uplink, the sleep duration is determined using box B in flow diagram 1800 (sleep_duration+=r×TS_Duration). In one embodiment, if the direction of the bidirectional time slots are uplink, it is determined if the device is assigned a time slot in the bidirectional time slots. In one embodiment, if the device is not assigned a time slot in the bidirectional time slots, the sleep duration is determined using box C in flow diagram 1800 (Sleep_Duration+=(r+m)×TS_Duration). In one embodiment, if the device is assigned bidirectional time slots, then the sleep duration is determined using the box D in flow diagram 1800 (sleep_duration+=[(r+(k−1)]×TS_Duration). The device then enters the sleep state at the end of the GACK time slot and sleeps for the determined sleep duration.

Figure 18:
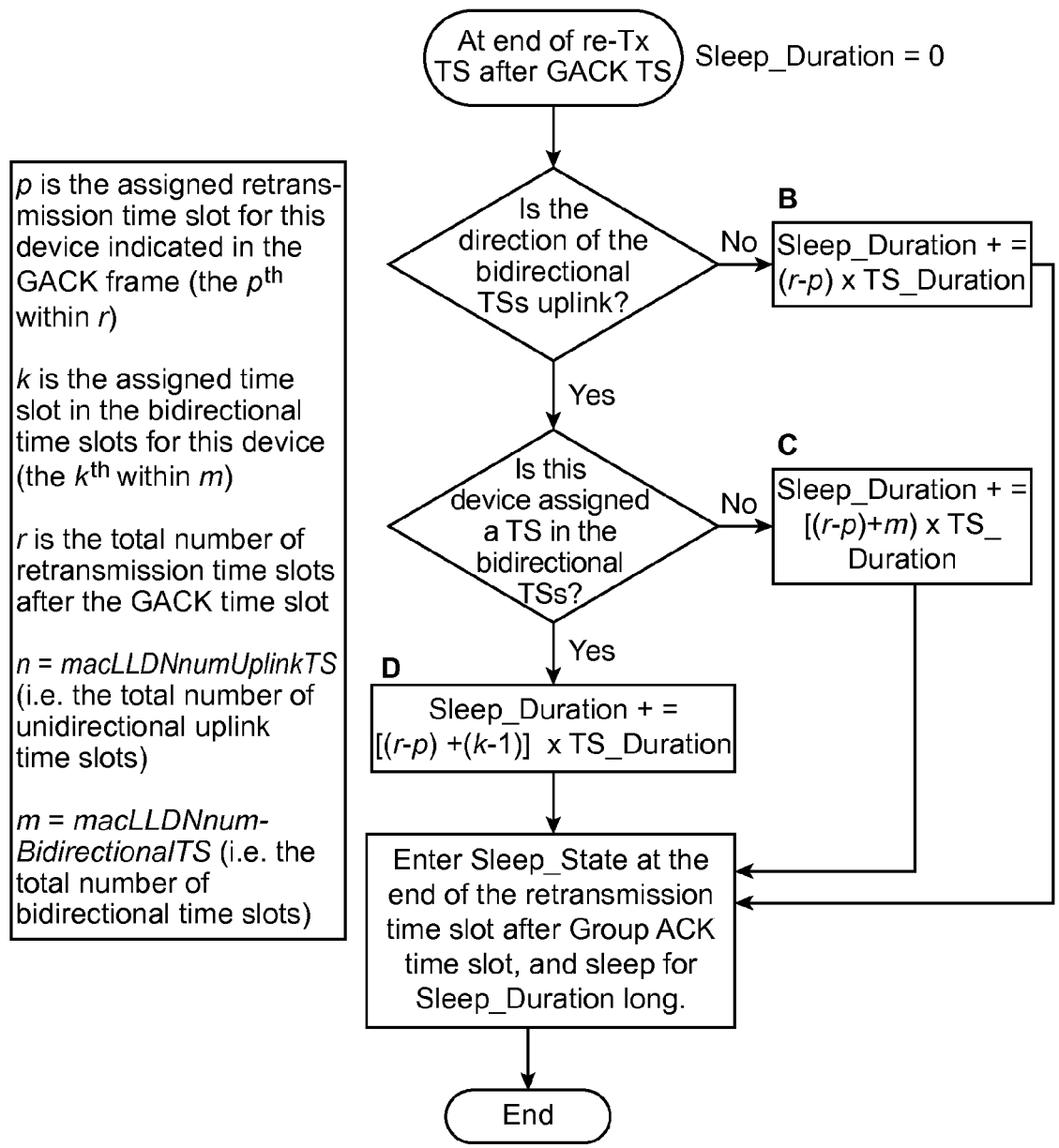
FIG. 18 shows a flow diagram for determining sleep duration at an end of an assigned retransmission time slot after the GACK time slot of a superframe communication, according to an embodiment.

FIG. 18 shows a flow diagram 1900 for determining sleep duration at an end of an assigned retransmission time slot after the GACK time slot of a superframe communication, according to an embodiment. In one embodiment, after transmitting at the assigned retransmission time slot after the GACK time slot, an LLDN power save device decides whether to enter Sleep state at the end of the retransmission time slot and, if it does, how long the Sleep_Duration will be. The flow diagram 1900 shows the functional flow for determining sleep duration at the end of an assigned retransmission time slot after a GACK time slot.

In the flow diagram 1900, p is the assigned retransmission time slot for the device indicated in the GACK frame (the $p^{th}$ within r); k is the assigned time slot in the bidirectional time slots for the device (the $k^{th}$ within m); r is the total number of retransmission time slots after the GACK time slot; n is the macLLDNnumUplinkTS (i.e., the total number of unidirectional uplink time slots); and m is the macLLDNnumBidirectionalTS (i.e., the total number of bidirectional time slots). In one embodiment, the flow diagram 1900 begins at the end of the retransmission time slot after the GACK time slot, where the sleep duration is set to 0. In one embodiment, next if the direction of the bidirectional time slots are not uplink, the sleep duration is determined using box B in flow diagram 1900 (sleep_duration+=(r−p)×TS_Duration). In one embodiment, if the direction of the bidirectional time slots are uplink, it is determined if the device is assigned a time slot in the bidirectional time slots. In one embodiment, if the device is not assigned a time slot in the bidirectional time slots, the sleep duration is determined using box C in flow diagram 1900 (Sleep_Duration=[(r−p)+m)]×TS_Duration). In one embodiment, if the device is assigned bidirectional time slots, then the sleep duration is determined using the box D in flow diagram 1900 (sleep_duration=[(r−p)+(k−1)]×TS_Duration). The device then enters the sleep state at the end of the retransmission time slot after the GACK time slot and sleeps for the determined sleep duration.

Figure 19:
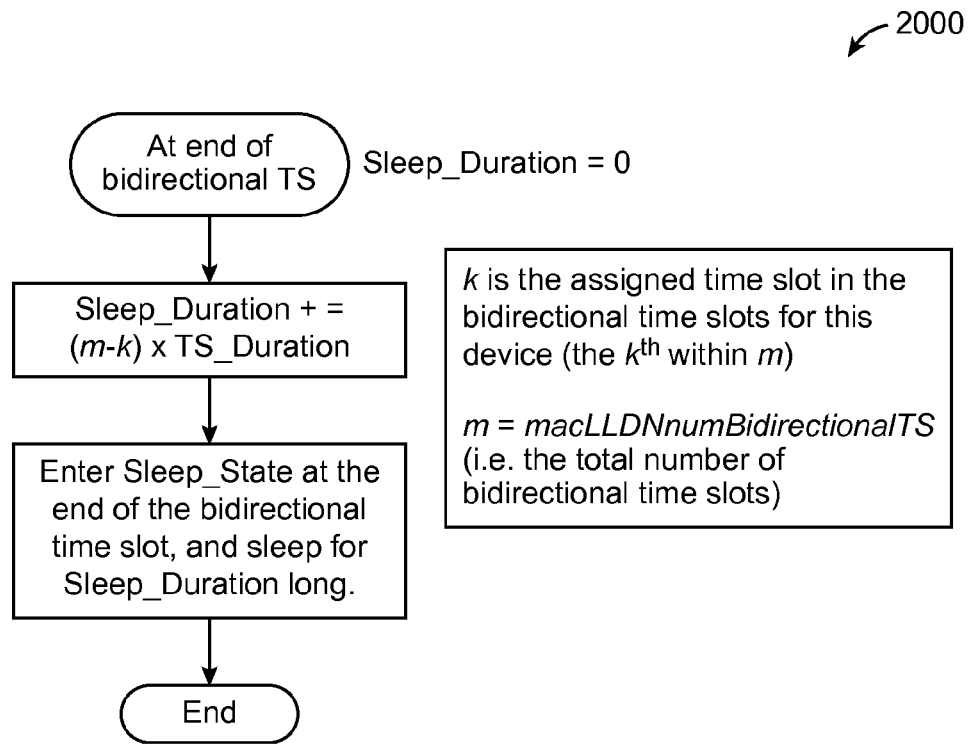
FIG. 19 shows a flow diagram for determining sleep duration at an end of an assigned bidirectional time slot of a superframe communication, according to an embodiment.

FIG. 19 shows a flow diagram 2000 for determining sleep duration at an end of an assigned bidirectional time slot of a superframe communication, according to an embodiment. In one embodiment, after transmitting at the assigned bidirectional time slot, an LLDN power save device decides whether to enter Sleep state at the end of the bidirectional time slot and, if it does, how long the Sleep_Duration will be. The flow diagram 2000 shows the functional flow for determining sleep duration at the end a bidirectional time slot.

In the flow diagram 2000, k is the assigned time slot in the bidirectional time slots for the device (the $k^{th}$ within m); and m is the macLLDNnumBidirectionalTS (i.e., the total number of bidirectional time slots). In one embodiment, the flow diagram 2000 begins at the end of the bidirectional time slot, where the sleep duration is set to 0. In one embodiment, the sleep duration is set to: sleep_duration+=(m−k)×TS_Duration). The device then enters the sleep state at the end of the bidirectional time slot at the end of the bidirectional time slot and sleeps for the determined sleep duration.

In one embodiment, when the sleep request is received through an LL beacon frame 1110 (FIG. 10), the devices that are requested to sleep enter the sleep state immediately after the beacon time slot, and sleep for the duration indicated in the Sleep Duration sub-field of the Sleep Control field. In one embodiment, the current superframe duration is counted as part of the duration in the Sleep Duration but the duration of the beacon time slot needs to be deducted from the residual sleeping duration in order for the device to successfully catch the desired LL beacon frame 1110.

In one embodiment, when the sleep request is received through a command frame during the downlink management time slot, the devices that are requested to sleep shall enter sleep state immediately after the downlink management time slot, and sleep for the duration indicated in the Sleep Duration sub-field of the Sleep Control field. In one embodiment, the current superframe duration is counted as part of the duration in the Sleep Duration, but the duration of the LL beacon time slot and the downlink management time slot needs to be deducted from the residual sleeping duration in order for the device to successfully catch the desired LL beacon.

In one embodiment, when the sleep request is received through a command frame during the bidirectional time slot, the devices that are requested to sleep shall enter sleep state at the end of this superframe and sleep for the duration indicated in the Sleep Duration sub-field of the Sleep Control field of the LL beacon frame 1110. The current superframe duration is not counted as part of the duration in the Sleep Duration. In one embodiment, as an alternative, the devices may also enter sleep state immediately after receiving the sleep request. In one embodiment, in this case the residual period of the current superframe is not part of the duration indicated in the Sleep Duration field. In one or more embodiments, the devices may wake up a bit earlier than the indicated wake-up time in order to adjust for the clock drift.

Figure 20:
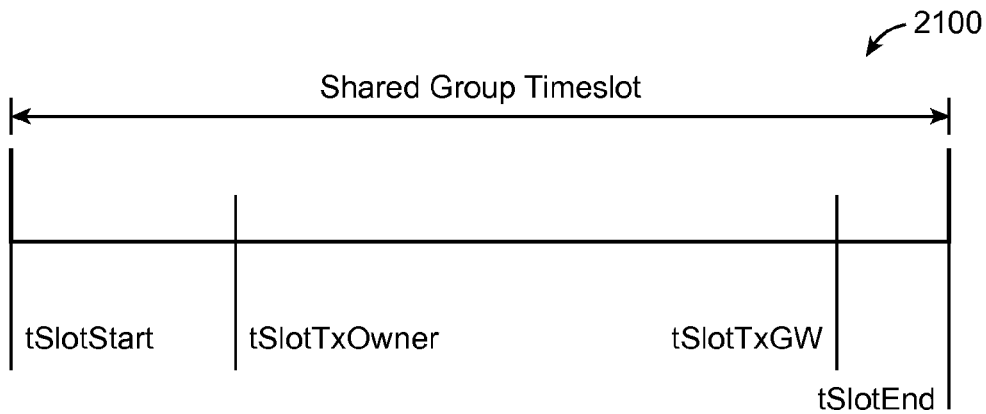
FIG. 20 shows time attributes of time slots, according to an embodiment.

FIG. 20 shows time attributes of time slots 2100. In one embodiment, in an LLDN superframe, each time slot is described by four time attributes. The meanings of the attributes are as follows:

1) tSlotStart: the starting time of time slot;
2) tSlotTxOwner: the end time of privileged access by a device that owns the time slot;
3) tSlotTxGW: if a time slot is unused, the LLDN PAN coordinator may use the time slot; and
4) tSlotEnd: the end time of the time slot.

According to the current standard, from tSlotTxGW till tSlotEnd, the LLDN PAN coordinator may use the time slot, if the time slot is still unused. In one embodiment, in the LLDN power save mode, when one or more devices are in the Sleep state, the PAN coordinator shall not send any frames to any of these sleeping devices. In one embodiment, in the LLDN power save mode, a device is allowed to go back to the Sleep state when the device wakes up before its assigned uplink time slot and finds out there is no data to transmit. The PAN coordinator shall not send any frames to this device after tSlotTxGW, even if this device is the owner of the time slot.

In one embodiment, if a device has uplink data to send to the coordinator in its assigned time slot, it may go to sleep as soon as it completes its transmission. In one embodiment, in this case the device should add the residual time of this time slot to its Sleep_Duration.

Figure 21:
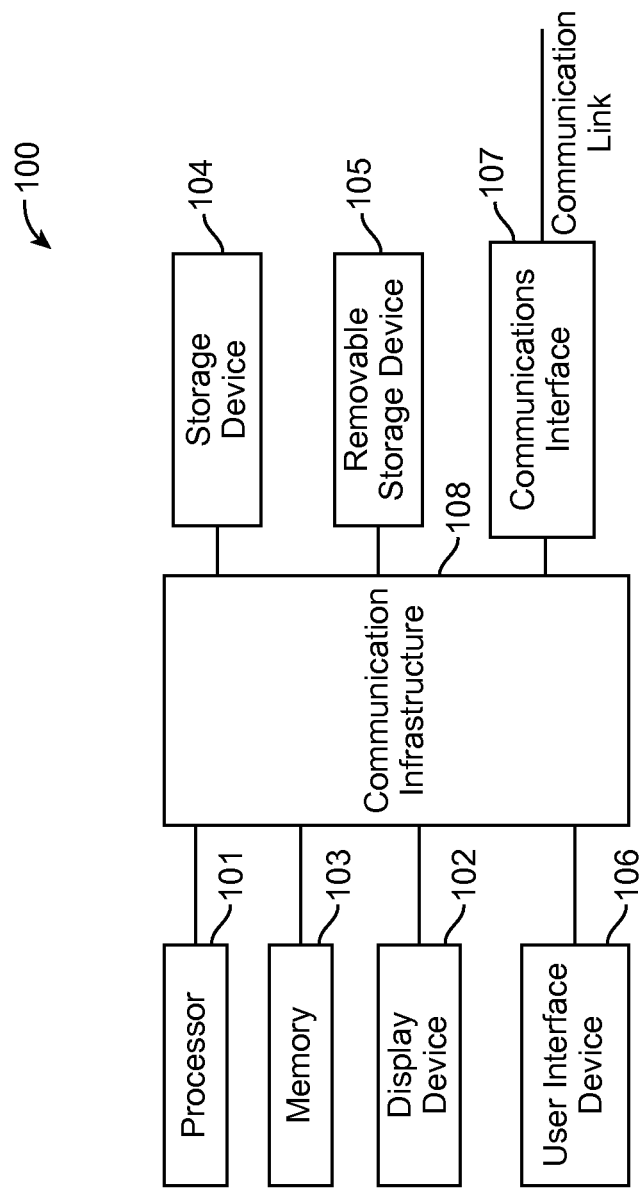
FIG. 21 is an exemplary high-level block diagram showing an information processing system comprising a computer system useful for implementing disclosed embodiments.

FIG. 21 is a high-level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method of wireless communication, comprising:
communicating, by a wireless device, power save capability information with a coordinator during a discovery state;
receiving, by the wireless device, a low latency (LL) beacon indicating a configuration state, the LL beacon including a modified LL frame comprising an additional sleep control field that includes an indication for a sleep command or a wake up command, and the additional sleep control field includes sub-fields comprising indications of application of the sleep command or the wakeup command for multiple wireless devices;

sending configuration status information to the coordinator; and receiving, by the wireless device, a configuration request command frame for entering or exiting the power save mode.

2. The method of claim 1, wherein the configuration request command frame includes power save mode configuration parameters.

3. The method of claim 2, wherein the sub-fields of the additional sleep control field further comprise indications of: sleep duration and a wireless device sleep control bitmap.

4. The method of claim 3, further comprising:
switching, by the wireless device, between an active state and a sleep state based on the configuration request command frame.

5. The method of claim 4, further comprising: switching, by the wireless device, to a sleep state based on the wireless device including power save capability upon at least one of:
the end of a beacon frame of the beacon if management time slots are not present in the beacon frame;
the end of management time slots if present;
the end of an assigned retransmission time slot of the wireless device if the wireless device needs to retransmit a communication;
the end of assigned uplink transmission time slots for the wireless device;
the end of a Group acknowledgement (ACK) time slot if the wireless device is not scheduled to retransmit at the time slot immediately after the Group ACK time slot;
the end of the retransmission time slot after the Group ACK time slot; or
the end of an assigned bidirectional time slot if the transmission direction is set to uplink.

6. The method of claim 5, further comprising:
switching, by the wireless device, from the sleep state to an active state based on the wireless device including the power save capability before at least one of:
the assigned retransmission time slot if the wireless device needs to retransmit a communication;
the assigned uplink transmission time slot;
the Group ACK time slot if the Group ACK is configured;
the retransmission time slot after the Group ACK time slot;
the bidirectional time slot if the wireless device is configured for a downlink transmission direction;
a bidirectional time slot if the wireless device is configured for uplink transmission direction and the wireless device is assigned to the bidirectional time slot; or
a next beacon.

7. The method of claim 6, wherein the wireless device and the coordinator are part of an LL deterministic network (LLDN) including a plurality of wireless devices.

8. The method of claim 7, wherein the standardized LLDN is part of a personal area network (PAN).

9. The method of claim 8, further comprising:
receiving, by the wireless device, a request to enter a sleep state from an active state for a pre-determined period using indications in the beacon upon the wireless device being in an active state.

10. The method of claim 9, further comprising:
receiving, by the wireless device, a PAN coordinator request to enter a sleep state based on a determination of an inactive period between device current operations or current measurements and next operations or next measurements.

11. A wireless device, comprising:
a media access control (MAC) layer;
a memory storing instructions; and
at least one processor configured to execute the instructions to perform operations including power save processing to communicate power save capability information with a coordinator during a discovery state, to send configuration status information to the coordinator based on a received low latency (LL) beacon indicating a configuration state, the LL beacon including a modified LL frame comprising an additional sleep control field that includes an indication for a sleep command or a wake up command, the additional sleep control field comprises sub-fields for indications of application of the sleep command or the wakeup command for multiple wireless devices, and to receive a configuration request command frame for entering or exiting the power save mode.

12. The wireless device of claim 11, wherein the wireless device is configured to receive the configuration request command frame including power save mode configuration parameters to grant entering or exiting the power save mode.

13. The wireless device of claim 11, wherein the sub-fields of the additional sleep control field further comprise indications of: sleep duration and a wireless device sleep control bitmap, and the wireless device is configured to switch between an active state and a sleep state based on the configuration request command frame.

14. The wireless device of claim 13, wherein upon the wireless device including power save capability, the wireless device is configured to switch to a sleep state as via request, by at least one of:
the end of a beacon frame of the beacon if management time slots are not present in the beacon frame;
the end of management time slots if present;
the end of an assigned retransmission time slot of the wireless device if the wireless device needs to retransmit a communication;
the end of assigned uplink transmission time slots for the wireless device;
the end of a Group acknowledgement (ACK) time slot if the wireless device is not scheduled to retransmit at the time slot immediately after the Group ACK time slot;
the end of the retransmission time slot after the Group ACK time slot; or
the end of an assigned bidirectional time slot if the transmission direction is set to uplink.

15. The wireless device of claim 14, wherein upon the wireless device including power save capability, the wireless device is configured to switch from the sleep state to an active state via request, before at least one of:
the assigned retransmission time slot if the wireless device needs to retransmit a communication;
the assigned uplink transmission time slot;
the Group ACK time slot if the Group ACK is configured;
the retransmission time slot after the Group ACK time slot;
the bidirectional time slot if the wireless device is configured for a downlink transmission direction;
a bidirectional time slot if the wireless device is configured for uplink transmission direction and the wireless device is assigned to the bidirectional time slot; or
a next beacon.

16. The wireless device of claim 15, wherein the wireless device and the coordinator are part of an LL deterministic network (LLDN) including a plurality of wireless devices.

17. The wireless device of claim 16, wherein the standardized LLDN is part of a personal area network (PAN), and the coordinator comprises a PAN coordinator.

18. The wireless device of claim 17, wherein the wireless device is configured to receive a request to enter a sleep state from an active state for a pre-determined period based on the indications in the beacon.

19. The wireless device of claim 18, wherein the wireless device is configured to receive a request to enter a sleep state based on a determination of an inactive period between device current operations or current measurements and next operations or next measurements.

20. A wireless coordinator, comprising:
a Physical Layer (PHY) configured to provide wireless communication over a wireless communication channel; and
a media access control (MAC) layer configured to manage transmissions for multiple wireless stations over a wireless channel,
wherein the coordinator is configured to receive power save capability information from a wireless device during a discovery state, to send a low latency (LL) beacon including a request for configuration status information, the LL beacon including a modified LL frame comprising an additional sleep control field that indicates a sleep command or a wake up command to the wireless device, the additional sleep control field comprises sub-fields for indications of application of the sleep command or the wakeup command for multiple wireless devices, and to receive a configuration status from the wireless device, and to send a configuration request command frame to the wireless device for entering or exiting the power save mode.

21. The wireless coordinator of claim 20, wherein the coordinator is configured to determine whether to grant entering or exiting the power save mode upon receipt of the configuration status information from the wireless device, and to send the configuration request command frame to the wireless device including power save mode configuration parameters.

22. The wireless coordinator of claim 21, wherein the further includes sub-fields of the additional sleep control field further comprise indications of: sleep duration and a wireless device sleep control bitmap, and the wireless device is configured to switch between an active state and a sleep state based on the configuration request command frame.

23. The wireless coordinator of claim 22, wherein upon the wireless device including power save capability, the coordinator is configured to request the wireless device to switch to a sleep state, by at least one of:
the end of a beacon frame of the beacon if management time slots are not present in the beacon frame;
the end of management time slots if present;
the end of an assigned retransmission time slot of the wireless device if the wireless device needs to retransmit a communication;
the end of assigned uplink transmission time slots for the wireless device;
the end of a Group acknowledgement (ACK) time slot if the wireless device is not scheduled to retransmit at the time slot immediately after the Group ACK time slot;
the end of the retransmission time slot after the Group ACK time slot; or
the end of an assigned bidirectional time slot if the transmission direction is set to uplink.

24. The wireless coordinator of claim 23, wherein the coordinator is configured to request the wireless device to switch from the sleep state to an active state, before at least one of:
the assigned retransmission time slot if the wireless device needs to retransmit a communication;
the assigned uplink transmission time slot;
the Group ACK time slot if the Group ACK is configured;
the retransmission time slot after the Group ACK time slot;
the bidirectional time slot if the wireless device is configured for a downlink transmission direction;
a bidirectional time slot if the wireless device is configured for uplink transmission direction and the wireless device is assigned to the bidirectional time slot; or
a next beacon.

25. The wireless coordinator of claim 24, wherein the coordinator and the wireless device are part of an LL deterministic network (LLDN) including a plurality of wireless devices.

26. The wireless coordinator of claim 25, wherein the standardized LLDN is part of a personal area network (PAN), and the coordinator is a PAN coordinator.

27. The wireless coordinator of claim 26, wherein the PAN coordinator is configured to send a request command frame to one or more wireless devices in an active state to switch to a sleep state for a pre-determined period using indications in the beacon, and the PAN coordinator is configured to not send the request to wireless devices already in a sleep state.

28. The wireless coordinator of claim 27, wherein the PAN coordinator is configured to request all or a portion of wireless devices in the standardized LLDN to enter a sleep state based on a determination of an inactive period between device current operations or current measurements and next operations or next measurements.

* * * * *